US012658809B2

(12) United States Patent
Cao et al.

(10) Patent No.: US 12,658,809 B2
(45) Date of Patent: Jun. 16, 2026

(54) RESONANT COMMUTATION AND QUASI-TRAPEZOIDAL CURRENT CONTROL IN ELECTRONIC TRANSFORMERS

(71) Applicant: VIRGINIA TECH INTELLECTUAL PROPERTIES, INC., Blacksburg, VA (US)

(72) Inventors: Yuliang Cao, Blacksburg, VA (US); Dong Dong, Blacksburg, VA (US)

(73) Assignee: VIRGINIA TECH INTELLECTUAL PROPERTIES, INC., Blacksburg, VA (US)

( * ) Notice: Subject to any disclaimer, the term of this patent is extended or adjusted under 35 U.S.C. 154(b) by 195 days.

(21) Appl. No.: 18/364,113

(22) Filed: Aug. 2, 2023

(65) Prior Publication Data
US 2025/0047188 A1    Feb. 6, 2025

(51) Int. Cl.
H02M 3/335        (2006.01)
H02M 1/00        (2006.01)
H02M 3/00        (2006.01)
(52) U.S. Cl.
CPC ..... H02M 3/33573 (2021.05); H02M 1/0058 (2021.05); H02M 3/01 (2021.05); H02M 3/33584 (2013.01)
(58) Field of Classification Search
CPC ...... H02M 1/0058; H02M 3/01; H02M 3/335; H02M 3/33569; H02M 3/33573; H02M 3/33576; H02M 3/33584
See application file for complete search history.

(56) References Cited

U.S. PATENT DOCUMENTS

| | | | |
|---|---|---|---|
| 5,481,449 A | 1/1996 | Kheraluwala et al. | |
| 6,178,098 B1 | 1/2001 | He et al. | |
| 8,193,788 B2 | 6/2012 | Chapman | |
| 9,887,627 B2 * | 2/2018 | Erickson, Jr. | ........... H02S 20/25 |

(Continued)

OTHER PUBLICATIONS

Final Office Action in U.S. Appl. No. 17/819,383, mailed Feb. 1, 2024.

(Continued)

*Primary Examiner* — Gary L Laxton
(74) *Attorney, Agent, or Firm* — Perilla Knox & Hildebrandt LLP; Jason M. Perilla

(57)        ABSTRACT

Power converters including electronic-embedded transformers for current sharing and load-independent voltage gain are described. An example power converter system includes an input, an output, a power converter between the input and output, and a controller. The converter includes a first bridge, a second bridge, and an electronic-embedded transformer between the first and second bridge. The electronic-embedded transformer includes a bidirectional coupling switch bridge. The controller generates drive control signals for quasi-trapezoidal current modulation control of the bidirectional coupling switch bridge. The controller is configured to generate the drive control signals based on a commutation coefficient k and a switching frequency for the power converter. The commutation coefficient k can be set based on an inductance in the electronic-embedded transformer, a capacitance in the bidirectional coupling switch bridge, and a margin for resonant current commutation.

14 Claims, 22 Drawing Sheets

(56)                References Cited

U.S. PATENT DOCUMENTS

| | | | |
|---|---|---|---|
| 10,186,977 | B2 | 1/2019 | Yamaoka et al. |
| 10,404,182 | B1 | 9/2019 | Abdel-Rahman |
| 10,498,247 | B2 | 12/2019 | Murakami et al. |
| 11,021,069 | B1 | 6/2021 | Elshaer et al. |
| 11,088,625 | B1 | 8/2021 | Cao et al. |
| 11,201,551 | B2 * | 12/2021 | Mariéthoz ........... H02M 1/0095 |
| 11,539,300 | B1 | 12/2022 | Wu et al. |
| 2005/0083714 | A1 | 4/2005 | Zhu et al. |
| 2006/0268589 | A1 | 11/2006 | Nakahori |
| 2012/0153729 | A1 | 6/2012 | Song et al. |
| 2012/0163035 | A1 | 6/2012 | Song et al. |
| 2014/0225439 | A1 | 8/2014 | Mao |
| 2015/0049518 | A1 | 2/2015 | Harrison et al. |
| 2015/0326141 | A1 * | 11/2015 | Takahashi ............... H01F 30/00 |
| | | | 363/126 |
| 2016/0099646 | A1 | 4/2016 | Safaee et al. |
| 2016/0111965 | A1 | 4/2016 | Wang et al. |
| 2017/0063251 | A1 | 3/2017 | Ye et al. |
| 2017/0358996 | A1 | 12/2017 | Higaki et al. |
| 2018/0102644 | A1 | 4/2018 | Perreault et al. |
| 2018/0248468 | A1 | 8/2018 | Ying et al. |
| 2019/0052177 | A1 | 2/2019 | Lu et al. |
| 2019/0058409 | A1 | 2/2019 | Ishibashi et al. |
| 2019/0252989 | A1 | 8/2019 | Toliyat et al. |
| 2019/0288606 | A1 | 9/2019 | Higaki et al. |
| 2019/0296650 | A1 | 9/2019 | Wang et al. |
| 2019/0355506 | A1 | 11/2019 | Fei et al. |
| 2020/0052604 | A1 | 2/2020 | Tayebi et al. |
| 2020/0076311 | A1 | 3/2020 | Bortis et al. |
| 2020/0091838 | A1 | 3/2020 | Wada et al. |
| 2020/0144926 | A1 | 5/2020 | Murakami |
| 2020/0177089 | A1 | 6/2020 | Abdel-Rahman |
| 2020/0195156 | A1 | 6/2020 | Kado et al. |
| 2020/0212816 | A1 | 7/2020 | Sun et al. |
| 2020/0321878 | A1 | 10/2020 | Zhang et al. |
| 2021/0083589 | A1 | 3/2021 | Dong et al. |
| 2021/0083590 | A1 | 3/2021 | Lu et al. |
| 2021/0099097 | A1 | 4/2021 | Zhang |
| 2021/0111629 | A1 | 4/2021 | Gray et al. |
| 2021/0155100 | A1 | 5/2021 | Khaligh et al. |
| 2021/0408927 | A1 | 12/2021 | Zhang et al. |
| 2022/0045628 | A1 | 2/2022 | Chen et al. |
| 2022/0123661 | A1 | 4/2022 | Ishibashi et al. |
| 2022/0161673 | A1 | 5/2022 | Jimenez Pino et al. |
| 2022/0216805 | A1 | 7/2022 | Itogawa et al. |
| 2022/0345046 | A1 | 10/2022 | Wang et al. |
| 2022/0385087 | A1 | 12/2022 | Sarnago Andia et al. |
| 2022/0385198 | A1 * | 12/2022 | Lou ................... H02M 3/33571 |
| 2022/0393606 | A1 | 12/2022 | Itogawa et al. |
| 2022/0416672 | A1 | 12/2022 | Zhuang et al. |
| 2023/0017288 | A1 | 1/2023 | Chen et al. |
| 2023/0261568 | A1 | 8/2023 | Liu et al. |
| 2023/0335335 | A1 * | 10/2023 | Tange ................. H01F 27/2895 |
| 2023/0361671 | A1 | 11/2023 | Ou et al. |
| 2023/0387816 | A1 | 11/2023 | Mallik et al. |
| 2023/0402927 | A1 | 12/2023 | Kawai |

OTHER PUBLICATIONS

Notice of Allowance for U.S. Appl. No. 17/819,383 mailed Jul. 2, 2024.

B. Zhao, Q. Song, W. Liu, and Y. Sun, "Overview of Dual-Active-Bridge Isolated Bidirectional DC-DC Converter forHigh-Frequency-Link Power-Conversion System," IEEE Transactions on Power Electronics, vol. 29, No. 8, pp. 4091-4106, Aug. 2014.

C. Zhao, Y.-H. Hsieh, F. C. Lee and Q. Li, "Design and Analysis of a High-frequency CLLC Resonant Converter withMedium Voltage insulation for Solid-State-Transformer," 2021 IEEE Applied Power Electronics Conference andExposition (APEC), 2021, pp. 1638-1642.

D. Dong, M. Agamy, J. Z. Bebic, Q. Chen and G. Mandrusiak, "A Modular SiC High-Frequency Solid-State Transformer for Medium-Voltage Applications: Design, Implementation, and Testing," in IEEE Journal of Emerging andSelected Topics in Power Electronics, vol. 7, No. 2, pp. 768-778, Jun. 2019.

D. Dong, R. Raju, G. Ganireddy and M. Agamy, "A Rotational Control in Medium-Voltage Modular Solid-State Transformer-Based Converter System," in IEEE Transactions on Industry Applications, vol. 55, No. 6, pp. 6223-6233,Nov.-Dec. 2019.

D. Rothmund, T. Guillod, D. Bortis, and J. W. Kolar, "99% Efficient 10 kV SiC-Based 7 kV/400 V DC Transformer forFuture Data Centers," IEEE J. Emerg. Sel. Topics Power Electron., vol. 7, No. 2, pp. 753-767, Jun. 2019.

F. Jin, A. Nabih, C. Chen, X. Chen, Q. Li and F. C. Lee, "A High Efficiency High Density DC/DC Converter for BatteryCharger Applications," 2021 IEEE Applied Power Electronics Conference and Exposition (APEC), 2021, pp. 1767-1774.

J. Liu, L. Ravi, D. Dong and R. Burgos, "A Single Passive Gate-Driver for Series-Connected Power Devices in DCCircuit Breaker Applications," in IEEE Transactions on Power Electronics, vol. 36, No. 10, pp. 11031-11035, Oct. 2021.

M. H. Ahmed, C. Fei, F. C. Lee and Q. Li, "48-V Voltage Regulator Module with PCB Winding Matrix Transformer forFuture Data Centers," in IEEE Transactions on Industrial Electronics, vol. 64, No. 12, pp. 9302-9310, Dec. 2017.

M. Mogorovicand D. Dujic, "100 kW, 10 kHz Medium-Frequency Transformer Design Optimization and ExperimentalVerification," inIEEE Transactions on Power Electronics, vol. 34, No. 2, pp. 1696-1708, Feb. 2019, doi:10.1109/TPEL.2018.2835564.

M. Ngo, Y. Cao, D. Dong and R. Burgos, "Design of 500 kHz, 18 kW Low Leakage Inductance Intraleaved Litz Wire Transformer for Bi-directional Resonant DC-DC Converter," 2021 IEEE Applied Power Electronics Conference andExposition (APEC), 2021, pp. 1153-1161.

M. Ngo, Y. Cao, K. Nguyen, D. Dong and R. Burgos, "Computational Fluid Dynamic Analysis and Design of an AirDuct Cooling System for 18 kW, 500 kHz Planar Transformers," 2021 IEEE Applied Power Electronics Conference andExposition (APEC), 2021, pp. 1496-1504.

Office Action in U.S. Appl. No. 17/819,353, mailed Oct. 13, 2023.

P. Czyz, T. Guillod, F. Krismer, J. Huber, and J. W. Kolar, "Design and Experimental Analysis of 166 kW Medium-Voltage Medium-Frequency Air-Core Transformer for 1:1-DCX Applications," IEEE Journal of Emerging and SelectedTopics in Power Electronics, pp. 1-1, 2021.

R. Raju, "Series resonant converters with the resonant capacitor replaced by a bridge," 2017 IEEE 12th InternationalConference on Power Electronics and Drive Systems (PEDS), 2017, pp. 999-1,002, doi: 10.1109/PEDS.2017.8289249.

T. Guillod, D. Rothmund, and J. W. Kolar, "Active Magnetizing Current Splitting ZVS Modulation of a 7 kV/400 V DCTransformer," IEEE Trans. Power Electron., vol. 35, No. 2, pp. 1293-1305, Feb. 2020, doi: 10.1109/TPEL.2019.2918622.

Thomas Guillod, "Active Magnetizing Current Splitting ZVS Modulation of a 7 kV/400 V DCTransformer", IEEE Transactions On Power Electronics, vol. 35, No. 2, Feb. 2020, pp. 1293-1305.

Tu, Hao, Hao Feng, SrdjanSrdic, and SrdjanLukic. "Extreme Fast Charging of Electric Vehicles: A TechnologyOverview." IEEE Transactions on Transportation Electrification 5,No. 4 (2019): 861-78.

W. Feng, P. Mattavelli, and F. C. Lee, "Pulsewidth Locked Loop (PWLL) for Automatic Resonant Frequency Tracking in LLC DC-DC Transformer (LLC-DCX)," IEEE Transactions on Power Electronics, vol. 28, No. 4, pp. 1862-1869, Apr. 2013.

X. Zhao, J. Hu, L. Ravi, D. Dong and R. Burgos, "Planar Common-Mode EMI Filter Design and optimization in a 100-kW SiC-based Generator-Rectifier System for High-Altitude Operation," 2021 IEEE Energy Conversion Congress andExposition (ECCE), 2021, pp. 3555-3562.

Y. Cao et al., "Design and Implementation of High-density Isolated Bi-directional Soft-switching Resonant DC-DCConverter with Partial Power Processing," 2021 IEEE Applied Power Electronics Conference and Exposition (APEC),2021, pp. 640-646.

Y. Cao et al., "Design and Implementation of an 18 kW 500 kHz 98.8% Efficiency High-density Battery Charger withPartial Power Processing," IEEE Journal of Emerging and Selected Topics in Power Electronics, pp. 1-1, 2021.

(56) References Cited

OTHER PUBLICATIONS

Y. Cao, M. Ngo, D. Dong and R. Burgos, "A Simplified Time-Domain Gain Model for CLLC Resonant Converter," 2021IEEE Energy Conversion Congress and Exposition (ECCE), 2021, pp. 3079-3086.

Y. Cao, M. Ngo, D. Dong and R. Burgos, "The ZVS Transition Analysis and Optimization for CLLC-Type Resonant DCTransformer," 2021 IEEE Energy Conversion Congress and Exposition (ECCE), 2021, pp. 3126-3133.

Y. Cao, M. Ngo, N. Yan, Y. Bai, R. Burgos and D. Dong, "DC Distribution Converter with Partial Power Processing forLVDC/MVDC Systems," 2021 IEEE Fourth International Conference on DC Microgrids (ICDCM), 2021, pp. 1-8.

Y. Cao, M. Ngo, R. Burgos, A. Ismail and D. Dong, "Switching Transition Analysis and Optimization for Bi- directionalCLLC Resonant DC Transformer," in IEEE Transactions on Power Electronics, doi: 10.1109/TPEL.2021.3125265.

Y. Liu, C. Chen, K. Chen, Y. Syu and N. A. Dung, "High-Frequency and High-Efficiency Isolated Two-StageBidirectional DC-DC Converter for Residential Energy Storage Systems," in IEEE Journal of Emerging and SelectedTopics in Power Electronics, vol. 8, No. 3, pp. 1994-2006, Sep. 2020.

Yuliang Cao, "A Scalable Electronic-Embedded Transformer, a New Concept Toward Ultra-High-Frequency High-Power Transformer in DC-DC Converters", IEEE Transactions On Power Electronics, vol. 38, No. 8, Aug. 2023, pp. 9278-9293.

Yuliang Cao, "Switching Transition Analysis and Optimization for Bidirectional CLLC Resonant DC Transformer", IEEE Transactions On Power Electronics, vol. 37, No. 4, Apr. 2022 pp. 3786-3800.

Z. Hu, Y. Qiu, L. Wang and Y. Liu, "An Interleaved LLC Resonant Converter Operating at Constant SwitchingFrequency," in IEEE Transactions on Power Electronics, vol. 29, No. 6, pp. 2931-2943, Jun. 2014.

Z. Li, Y. -H. Hsieh, Q. Li, F. C. Lee and M. H. Ahmed, "High-Frequency Transformer Design with High-VoltageInsulation for Modular Power Conversion from Medium-Voltage AC to 400-V DC," 2020 IEEE Energy ConversionCongress and Exposition (ECCE), 2020, pp. 5053-5060.

Office Action in U.S. Appl. No. 18/364,088 mailed May 14, 2025.

Office Action in U.S. Appl. No. 18/364,088 mailed Oct. 23, 2025.

* cited by examiner

10

10

30

40

50

RESONANT COMMUTATION AND QUASI-TRAPEZOIDAL CURRENT CONTROL IN ELECTRONIC TRANSFORMERS

BACKGROUND

Many electronic devices and systems rely upon power at a well-regulated, constant, and well-defined voltage for proper operation. In that context, power conversion devices and systems are relied upon to convert electric power or energy from one form to another. A power converter is an electrical or electro-mechanical device or system for converting electric power or energy from one form to another. As examples, power converters can convert alternating current (AC) power into direct current (DC) power, convert DC power to AC power, provide a DC to DC conversion, provide an AC to AC conversion, change or vary the characteristics (e.g., the voltage rating, current rating, frequency, etc.) of power, or offer other forms of power conversion. A power converter can be as simple as a transformer, but many power converters have more complicated designs and are tailored for a variety of applications and operating specifications.

An isolated bidirectional DC transformer (DCX) is one example of a power converter. DCX converters play a significant role in applications such as electric vehicle (EV) chargers, high voltage data center power systems, energy storage systems, solid-state transformers, and other applications. DCX converters can interface two different DC buses or loads with high conversion efficiency. Series resonant converters (SRC), such as LLC or CLLC converters, are popular forms of DCX converters, due to the full load range zero voltage switching (ZVS) operation, low circulating current, and no requirement for voltage regulation offered by such converters.

SUMMARY

Power converters including electronic-embedded transformers for current sharing and load-independent voltage gain are described. An example power converter system includes an input, an output, a power converter between the input and output, and a controller. The converter includes a first bridge, a second bridge, and an electronic-embedded transformer between the first and second bridge. The electronic-embedded transformer includes a bidirectional coupling switch bridge. The controller generates drive control signals for quasi-trapezoidal current modulation control of the bidirectional coupling switch bridge. The controller is configured to generate the drive control signals based on a commutation coefficient k and a switching frequency for the power converter. The commutation coefficient k can be set based on an inductance in the electronic-embedded transformer, a capacitance in the bidirectional coupling switch bridge, and a margin for resonant current commutation. In another example, an electronic-embedded transformer for a power converter includes a primary winding, a secondary winding, a resonant inductor for use in the power converter, a bidirectional coupling switch bridge, and a controller configured to generate drive control signals for quasi-trapezoidal current modulation control of the bidirectional coupling switch bridge. The resonant inductor can be embodied as leakage inductance among the primary winding and the secondary winding.

In another example, a power converter system includes a power converter having a first bridge of switching devices and a second bridge of switching devices, an electronic-embedded transformer between the first bridge and the second bridge, and a controller. The electronic-embedded transformer can include a bidirectional coupling switch bridge, and the bidirectional coupling switch bridge can include switching devices $Q_1$ and $Q_2$ and capacitors $C_{o1}$ and $C_{o2}$. The controller can be configured to generate switching control signals for the first bridge of switching devices and the second bridge of switching devices and generate drive control signals for the switching devices $Q_1$ and $Q_2$.

Among the embodiments, the bidirectional coupling switch bridge can include bidirectional switching devices $Q_1$ and $Q_2$ and capacitors $C_{o1}$ and $C_{o2}$. The drive control signals can control switching operations of the bidirectional switching devices $Q_1$ and $Q_2$. The controller can be configured to generate the drive control signals based on a commutation coefficient k and a switching frequency for the power converter.

BRIEF DESCRIPTION OF THE DRAWINGS

Many aspects of the present disclosure can be better understood with reference to the following drawings. The components in the drawings are not necessarily drawn to scale, with emphasis instead being placed upon clearly illustrating the principles of the disclosure. In the drawings, like reference numerals designate corresponding parts throughout the several views.

DETAILED DESCRIPTION

Figure 1:
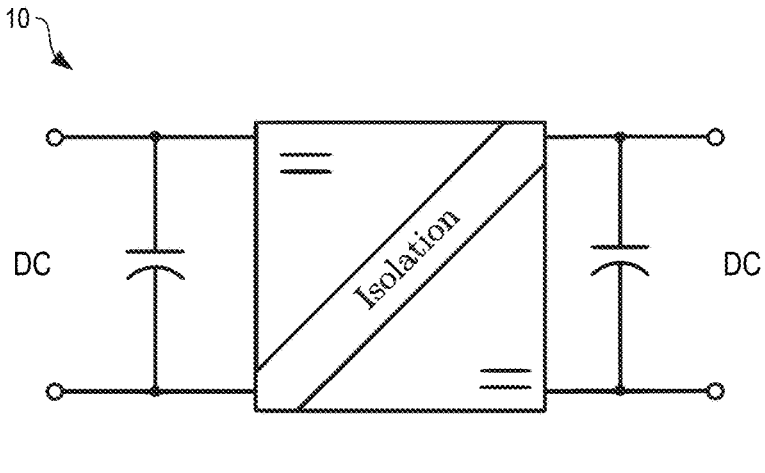
FIG. 1 illustrates an example isolated bidirectional resonant DC transformer (DCX) according to aspects of the embodiments.

To meet the demands for electrical vehicle (EV) charging systems, energy storage systems (ESSs), data center power supplies, solid-state transformer (SST) systems, and related systems, bidirectional fixed-ratio DC-DC converters, namely DC transformer (DCX) power converters, have been widely adopted. DCX-based power converters can interface two different DC buses or loads with high conversion efficiency. Due to the simple control, fixed switching frequency, and the galvanic isolation they provide, DCX-based power converters can provide a very high conversion efficiency path when used to bridge two DC buses. DCX converters can also provide galvanic (i.e., electrical) isolation between the input and output of the DCX. DCX converters also provide bidirectional power flow, load-independent constant voltage gain, and high efficiency with simple open loop control. If output voltage regulation is required, a front-end AC/DC stage, a rear-end DC/DC stage, or an input-parallel-output-series (IPOS) DC regulator can be adopted.

To meet high-power and high-density requirements at the same time, the use of increased switching frequencies in DCX-based power converters is already a trend. With the fast development of wide band gap (WBG) semiconductor materials, such as gallium nitride (GaN) and silicon carbide (SiC), some of the high-frequency design challenges can be addressed by adopting high-current/voltage high-efficient SiC/GaN power modules.

A range of DCX-based power converters are known, including unregulated, semi-regulated, and regulated converters. Two common circuit topologies for DCX power converters include the dual active bridge (DAB) and the series resonant converter (SRC). SRC-based DCX converters can be more desirable because they have lower circulating currents and can operate with full zero voltage switching (ZVS). Particularly, SRC-based DCX power converters, such as LLC or CLLC converters, are popular forms of DCX converters, due to the full load range ZVS operation, low circulating current, and open loop control with no requirement for voltage regulation. SRC-based DCX converters can also be designed using a number of different topologies, such as full-bridge LLC converters with full-bridge rectifiers, half-bridge LLC converters with a half-bridge rectifiers, and others. Parallel resonant DCX converters and series-parallel DCX converters are also known.

Overall, compared with DAB converters, LLC resonant converters are more desirable because of the lower circulating current and full load range zero voltage switching (ZVS). Moreover, when the resonant LLC/CLLC converters operate at (or slightly below) the resonant frequency as an LLC/CLLC-DCX, it can provide a load-independent constant voltage gain without any closed-loop voltage control. When a DCX-based power converter operates as a resonant converter, the leakage inductance of the high-frequency transformer should be minimized because a larger leakage inductance will cause a higher current ringing during the deadtime and a higher voltage stress on the resonant capacitor.

However, the design of DCX-based power converters operating at high-frequencies (e.g., over 100 kHz) with both high power-rating and high-efficiency remains challenging because of several fundamental design issues. As mentioned above, to transfer high power with LLC/CLLC DCX-based power converters at high frequencies, the leakage inductance should be minimized. Two common ways to reduce leakage inductance include interleaving the primary and secondary windings and more compact designs with smaller parasitic parameters. Still, in high-power applications, either high voltage or high current will bring challenges for the minimization of leakage inductance. For high-voltage applications, enough clearance between the primary and secondary sides is required, which limits the interleaving technique and perfect coupling. On the other hand, for high-current applications, more space is required for transformer cooling, which is difficult to achieve with a compact design.

Additionally, DCX-based power converters can incorporate transformer paralleling and modularization techniques to overcome certain design trade-offs as compared to the use of a single transformer. A transformer-level paralleling solution can be more desirable because a single full rating power inverting/rectifying bridge achieves high-density integration and lower costs with the use of a smaller number of gate drivers and auxiliary components. However, paralleling transformers is challenging in SRC-based DCX converters because current sharing among paralleled high-frequency transformers is very sensitive to the resonant tank parameters in the transformers. The current sharing is determined by the loop impedance of each transformer, which is mainly determined by the total leakage inductance of each transformer in the high-frequency range. As mentioned above, the leakage inductance of each high-frequency transformer should be minimized, as any small inductance mismatch from manufacturing will lead to a significant current sharing mismatch. Even if there is a small parameter tolerance between two resonant tanks among shared transformers, the more current will go through the resonant tank having a smaller impedance, which can lead to poor efficiency and thermal issues. Some approaches have been explored to address current sharing issues in parallelized SRC-based DCX converters. The approaches have various drawbacks, however, such as complicated transformer designs, limited operating parameters and applications, and topologies that are difficult to scale and modularize.

To address such current-sharing issues and provide a better solution for DCX-based power converters capable of higher power operation and power density, DCX-based power converters including EETs ("EET-DCX power converters") are described in U.S. patent application Ser. No. 17/819,353, titled "ELECTRONIC TRANSFORMER FOR CURRENT SHARING AND LOAD-INDEPENDENT VOLTAGE GAIN," filed Aug. 12, 2022 ("the '353 application"), the entire contents of which is hereby incorporated herein by reference. With a simple open-loop control for both the high voltage (HV) and low voltage (LV) bridges in the EET-DCX power converters described in the '353 application, the EET-DCX power converters can provide a load-independent constant voltage gain with a natural current sharing among different EET units. The EET-DCX power converters offer simple open-loop control, transformer-level parallelizing, natural current sharing, robust load-independent voltage gain, optimal operation at any frequency, and scalability.

The EET-DCX power converters described in the '353 application can still be improved, however. For example, the EET-DCX power converters operate with a triangular transformer current without considering the magnetizing inductance. Compared with the sinusoidal current in traditional resonant CLLC-DCX power converters, the triangular current exhibits a larger root mean square (rms) value, which will cause higher conduction losses in both the HV and LV devices and in the transformer windings. EET-DCX power converters also rely upon four active switches to form the LV bridge. The additional active switches result in more losses and cost.

In the context outlined above, a number of DCX-based power converter embodiments including resonant commutation electronic-embedded transformers (RC EETs) are described herein ("RC EET-DCX power converters"). The RC EET-DCX power converters including RC EETs have decreased rms current and rely upon fewer active switches in the LV bridge. Additionally, a new quasi-trapezoidal current modulation technique for RC EET-DCX power converters is also described herein. According to the concepts described herein, the transformer current commutation from "positive" to "negative" utilizes a resonance between paralleled capacitors and transformer leakage inductances $L_k$. In some examples, as compared with the triangular and sinusoidal currents in EET-DCX and CLLC-DCX power converters, the rms current can be reduced up to 15% and 11%, respectively.

By employing resonant modulation, the quasi-trapezoidal currents in RC EET-DCX power converters exhibit smaller rms and peak values under the same power transfer conditions. The proposed RC EET-DCX power converters benefit from lower conduction and switching losses due to lower rms currents, lower peak currents, and the use of fewer active switching devices in the LV bridge. Additionally, the LV bridge in the RC EET can be implemented as a monolithic bidirectional switch, which is undergoing rapid development and can further reduce the total losses and cost. All the advantages associated with the EET-DCX presented in the '353 application, such as natural current sharing and load-independent voltage gain, among other advantages, are retained in the RC EET-DCX power converters described herein.

According to aspects of the embodiments, power converters including converters including electronic-embedded transformers for current sharing and load-independent voltage gain are described. An example power converter system includes an input, an output, a power converter between the input and output, and a controller. The converter includes a first bridge, a second bridge, and an electronic-embedded transformer between the first and second bridge. The electronic-embedded transformer includes a bidirectional coupling switch bridge. The controller generates drive control signals for quasi-trapezoidal current modulation control of the bidirectional coupling switch bridge. The controller is configured to generate the drive control signals based on a commutation coefficient k and a switching frequency for the power converter. The commutation coefficient k can be set based on an inductance in the electronic-embedded transformer, a capacitance in the bidirectional coupling switch bridge, and a margin for resonant current commutation. Turning to the drawings, FIG. 1 illustrates an example isolated bidirectional resonant DCX converter 10 ("DCX 10") according to aspects of the embodiments. The DCX 10 is electrically coupled between a first or input DC bus and a second or output DC bus as shown. The DCX 10 can provide galvanic isolation and bidirectional power flow between the input and the output with high efficiency and simple open loop control. The DCX 10 is an SRC-based DCX converter, as described in further detail below, although the concepts described herein are not limited to use with only SRC-based DCX converters. The concepts can be applied to other types of DCX converters in some cases and to other types of converters.

Figure 2:
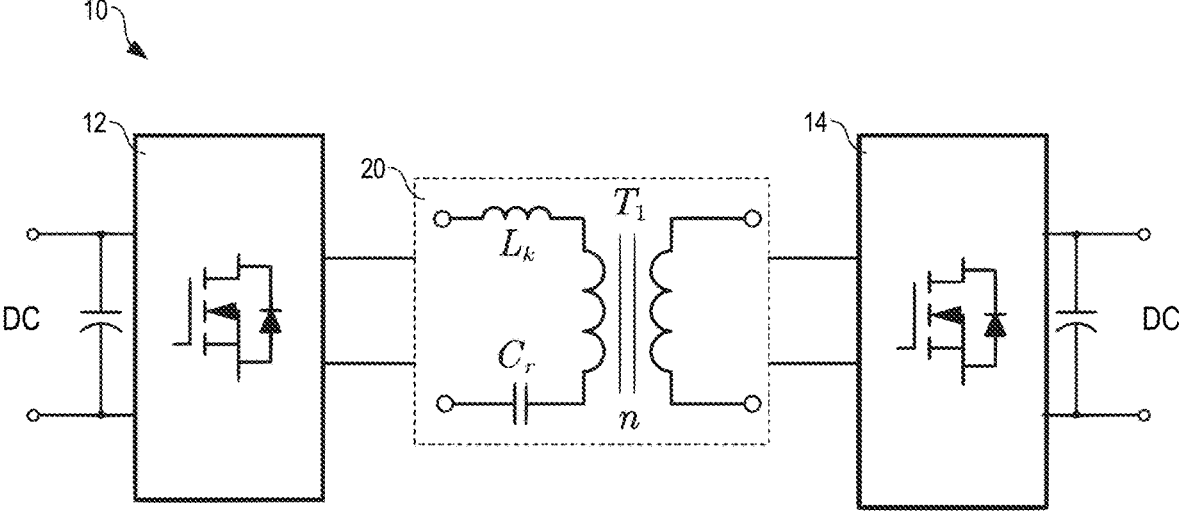
FIG. 2 illustrates another example of the DCX shown in FIG. 1 according to aspects of the embodiments.

FIG. 2 illustrates another example of the DCX 10 shown in FIG. 1. The DCX 10 includes a first or input switching bridge 12, a second or output switching bridge 14, and a transformer 20 coupled between the switching bridges 12 and 14. The input switching bridge 12 can include a first bridge of switching devices, such as full bridge arrangement of switching transistors, and the output switching bridge 14 can include a second bridge of switching devices, such as another full bridge arrangement of switching transistors. As described in further detail below, the transistors in the switching bridges 12 and 14 can be driven with complimentary control signals, to direct the power flow between the two sides of the DCX 10, in either direction. Power flow in the DCX 10 can be directed by phase-shifting the drive control signals of the switching bridges 12 and 14 with respect to each other using phase shift modulation, for example.

The transformer 20 includes primary and secondary windings, as would be understood in the field, for galvanic isolation between the two sides of the DCX 10. The transformer 20 also includes a resonant tank, which is provided by a capacitor $C_r$ and an inductor $L_k$, which is relied upon for (and permits) the SRC-based operation of the DCX 10. The inductor $L_k$ can be embodied by the leakage inductance of the transformer 20 in some cases. As described with reference to FIG. 8 in the '353 application, the transformer 20 can be parallelized in the DCX 10 to achieve higher power operation and increased power density. However, paralleling transformers in the DCX 10 can be challenging, because even a small tolerance or difference between the resonant tanks among the transformers will lead to current-sharing issues among the paralleled transformers. Thus, the transformer 20 can be implemented as an RC EET to provide certain benefits, particularly when the DCX 10 includes paralleled transformers. Coupling of the resonant capacitor $C_r$ is then electronically-controlled.

Figure 3:
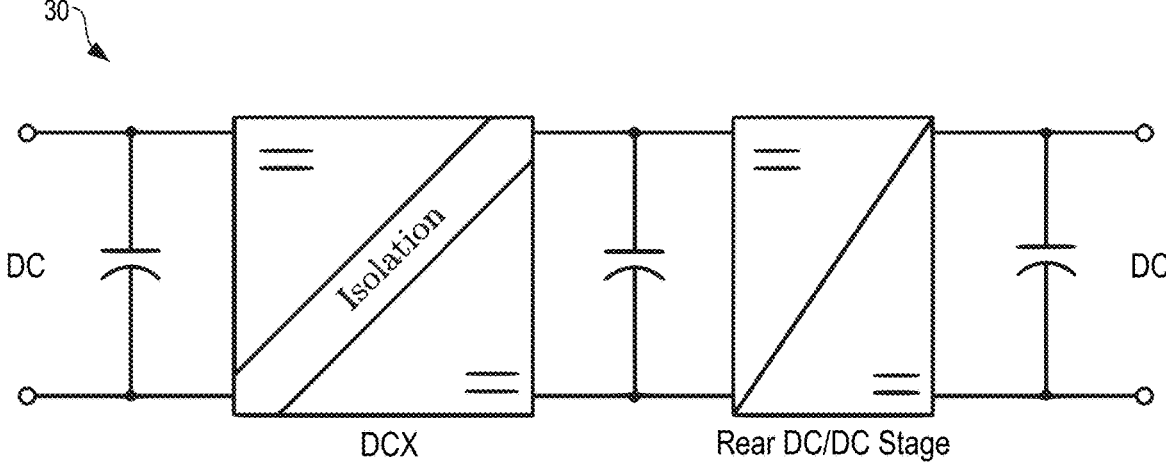
FIG. 3 illustrates an example of a DCX with voltage regulation according to aspects of the embodiments.
Figure 4:
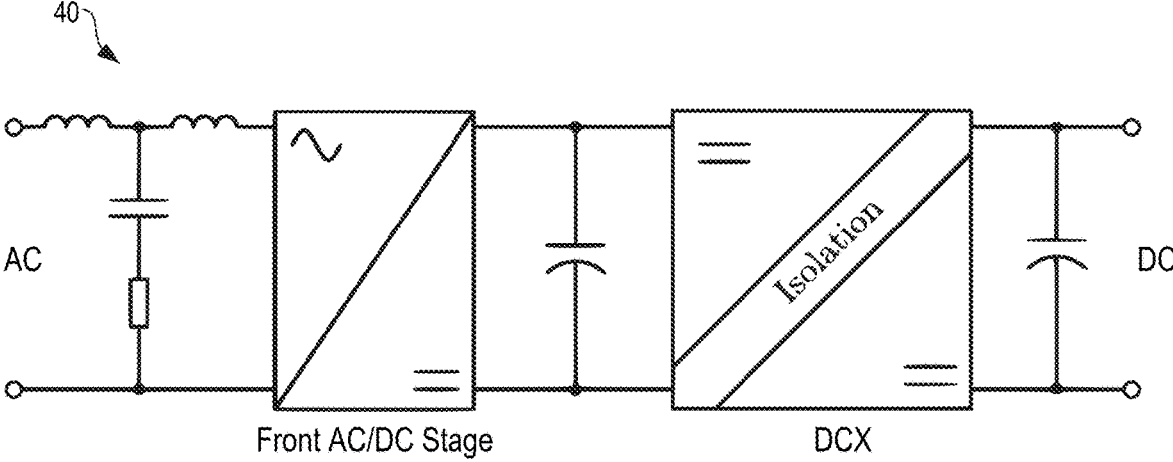
FIG. 4 illustrates another example of a DCX with voltage regulation according to aspects of the embodiments.
Figure 5:
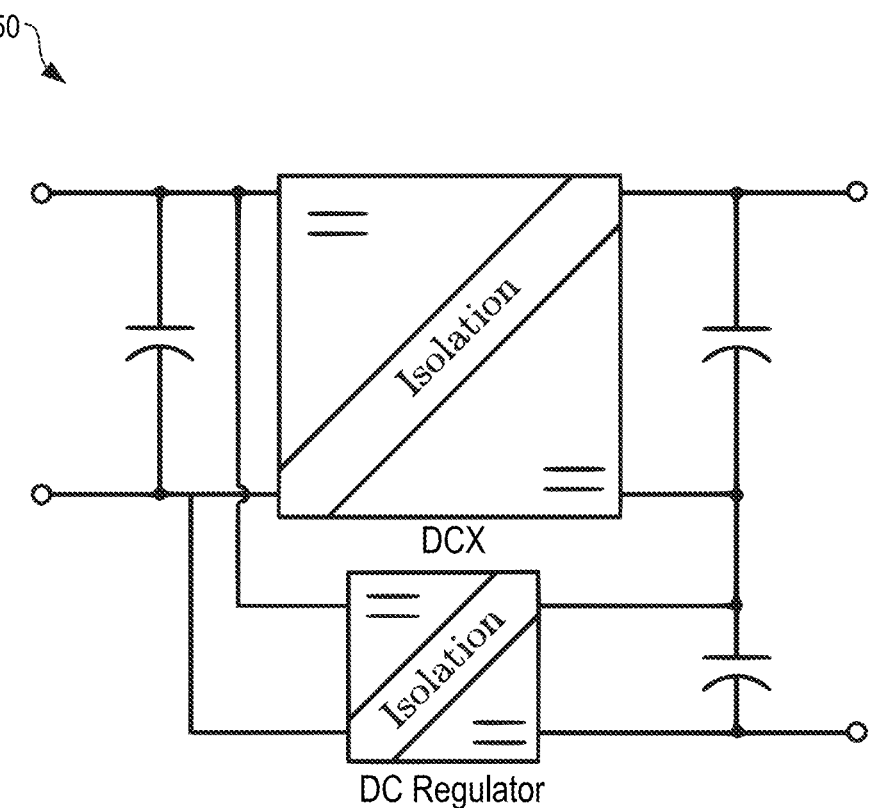
FIG. 5 illustrates another example of a DCX with voltage regulation according to aspects of the embodiments.

Other power converter configurations including DCX converters can include additional stages. As examples, FIGS. 3-5 illustrate DCX converters with additional stages for voltage regulation. FIG. 3 illustrates a converter 30 with a front-end DCX stage and a rear-end regulated DC/DC converter stage. The rear-end DC/DC converter stage can provide a regulated output voltage, for example, or other regulation in the power conversion of the converter 30. FIG. 4 illustrates a converter 40 with a front-end AC/DC converter stage and a rear-end DCX converter stage. The front-end AC/DC converter stage can provide AC/DC conversion, a regulated voltage for the DCX converter stage, or other conversion or regulation in the converter 40. FIG. 5 illustrates a converter 50 in a quasi-parallel configuration. The converter 50 connects a DCX converter and a DC regulator converter in series. A benefit of the converter 50 is the ability to achieve higher conversion efficiency by sharing or distributing the input power between the DCX converter and the DC regulator converter.

Figure 6:
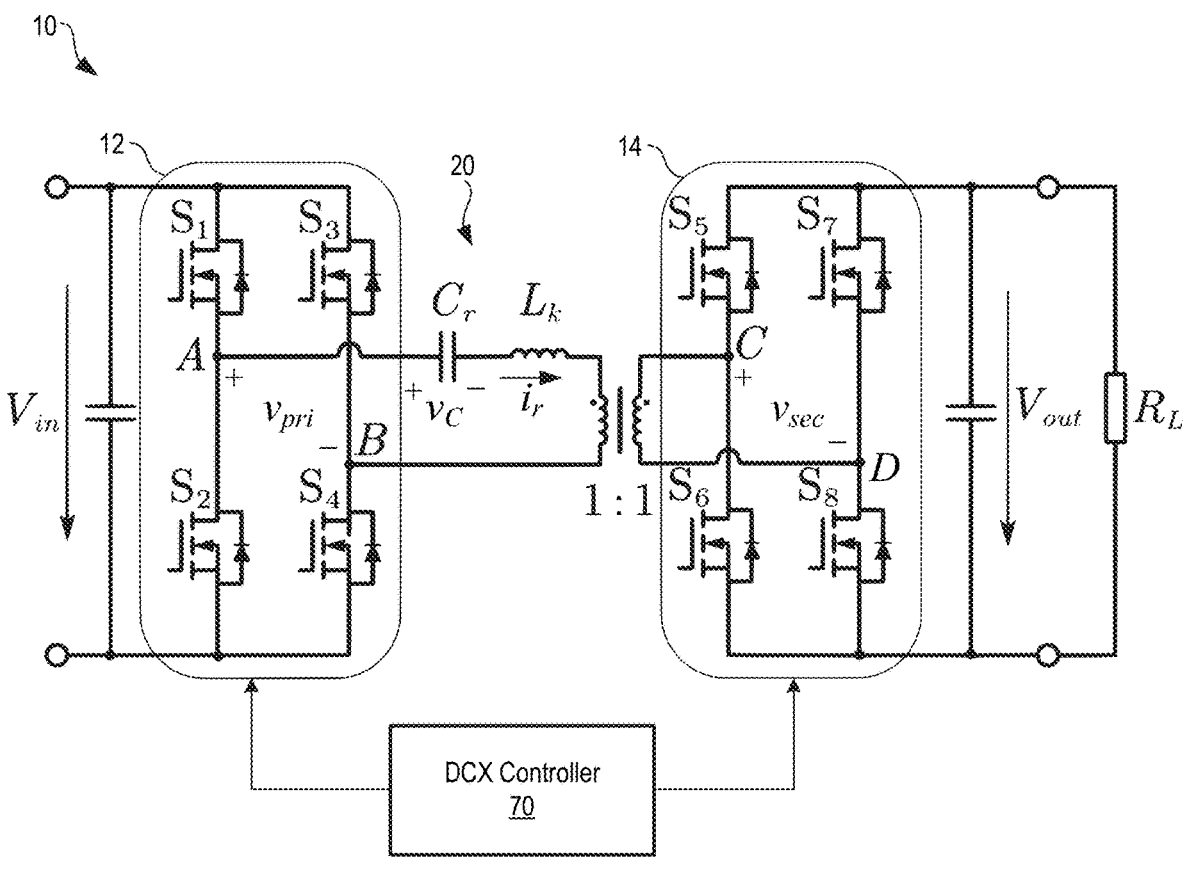
FIG. 6 illustrates a more detailed schematic diagram of the DCX shown in FIG. 2 according to aspects of the embodiments.

FIG. 6 illustrates a more detailed schematic diagram of the DCX 10 shown in FIG. 2. The DCX 10 is an example of an SRC-based DCX, to be distinguished from the EET-DCX power converters described in the '353 application and also from the RC EET-DCX power converters described herein. As shown, the first or input switching bridge 12 includes switching devices $S_1$-$S_4$ arranged in a full bridge, and the second or output switching bridge 14 includes switching devices $S_5$-$S_8$ arranged in a full bridge. The DCX 10 also includes a DCX controller 70. The switching devices $S_1$-$S_4$ and $S_5$-$S_8$ can be embodied as switching transistors, such as insulated-gate bipolar transistors or other suitable transistors. The switching devices $S_1$-$S_4$ and $S_5$-$S_8$ can be embodied in WBG semiconductor materials, such GaN and silicon carbide SiC semiconductor materials.

The DCX controller 70 can be embodied as processing circuitry, including memory, configured to control the operation of the DCX 10, with or without feedback. The DCX controller 70 can be embodied as any suitable type of controller, such as a proportional integral derivative (PID) controller, a proportional integral (PI) controller, or a multi-pole multi-zero controller, among others, to control the operations of the DCX 10. The DCX controller 70 can be realized using a combination of processing circuitry and referenced as a single controller. It should be appreciated, however, that the DCX controller 70 can be realized using a number of controllers, control circuits, drivers, and related circuitry, operating with or without feedback.

In some cases, the DCX controller 70 can receive a metric or measure of one or more of the input voltage $V_{in}$, the input current, the output voltage $V_o$, the output current or power provided to the load $R_L$, the resonant converter operating frequency fs, or other operating metrics of the DCX 10 as inputs, along with external control inputs. The DCX controller 70 is configured to generate switching control signals for the switching devices $S_1$-$S_4$ and $S_5$-$S_8$ at a switching frequency $f_s$. The switching control signals direct the operation of the switching devices $S_1$-$S_4$ and $S_5$-$S_8$ to transfer power between the input and the output of the DCX 10. In one example, the switching devices $S_1$, $S_4$, $S_5$, and $S_8$ can share a first control signal provided by the DCX controller 70, and the switching devices $S_2$, $S_3$, $S_6$, and $S_7$ can share a second control signal provided by the DCX controller 70, where the first and second control signals have complimentary "on" and "off" timings. The DCX controller 70 can generate the switching control signals based, at least in part, on the feedback metrics of the DCX 10, although the DCX 10 can also operate with open loop control in some cases. The duty cycle of the switching control signals can be varied by the DCX controller 70 to direct the transfer of power by the DCX 10.

The transformer 20 in the DCX 10 includes a resonant capacitor $C_r$ and an inductor $L_k$. The inductor $L_k$ can be embodied as the leakage inductance of the transformer 20, as one example, or as a separate inductor. The resonant capacitor $C_r$ can be embodied as a parasitic capacitance of the transformer 20 or as a separate capacitor. Due to the presence of the resonant capacitor $C_r$ and inductor $L_k$ in the DCX 10, the currents $i_{pri}$ and $i_{sec}$ through the primary and secondary sides of the transformer 20 are both sinusoidal waveforms. The resonant frequency $f_r$ of DCX 10 can be derived as:

$$f_r = \frac{1}{2\pi\sqrt{C_r L_k}}. \tag{1}$$

Figure 7:
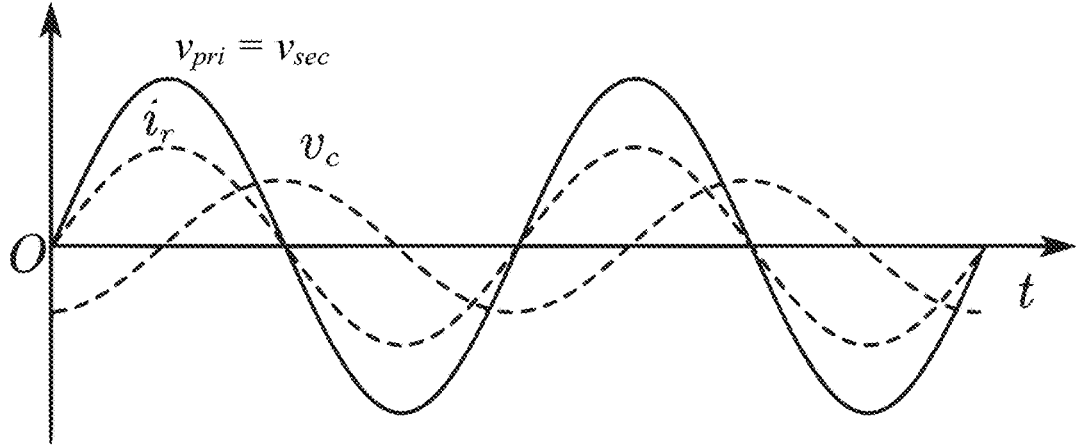
FIG. 7 illustrates an example of certain voltages and currents in the DCX shown in FIG. 2 during resonant operation according to aspects of the embodiments.

When the DCX 10 is operating at the resonant frequency $f_r$, the primary and secondary side voltages $v_{pri}$ and $v_{sec}$ and the current $i_r$ through the resonant tank of the transformer 20 are in phase, as shown in FIG. 7. When DCX 10 operates at a switching frequency $f_s$ that is equal to the resonant frequency $f_r$, the impedances produced by $C_r$ and $L_k$ will cancel each other, and the equivalent impedance on the loop will be very small and close to 0. Additionally, the sinusoidal voltage $v_C$ across $C_r$ has a 90° phase shift delay with respect to the primary and secondary side voltages $v_{pri}$ and $v_{sec}$, as also shown in FIG. 7. In this situation, power can be transferred by the DCX 10 at high efficiency, with load-independent voltage gain, and ZVS operation.

However, even a relatively small change in the values of $C_r$ and $L_k$ will shift the resonant frequency $f_r$ of the DCX 10. Without a corresponding change in the switching frequency $f_s$, the impedance on the power transfer loop in the transformer 20 will increase relatively dramatically and the DCX 10 cannot operate with optimal power transfer. This mismatch will result in load-dependent voltage transfer gain, as opposed to load-independent voltage gain, and efficiency deterioration for the DCX 10.

Figure 8:
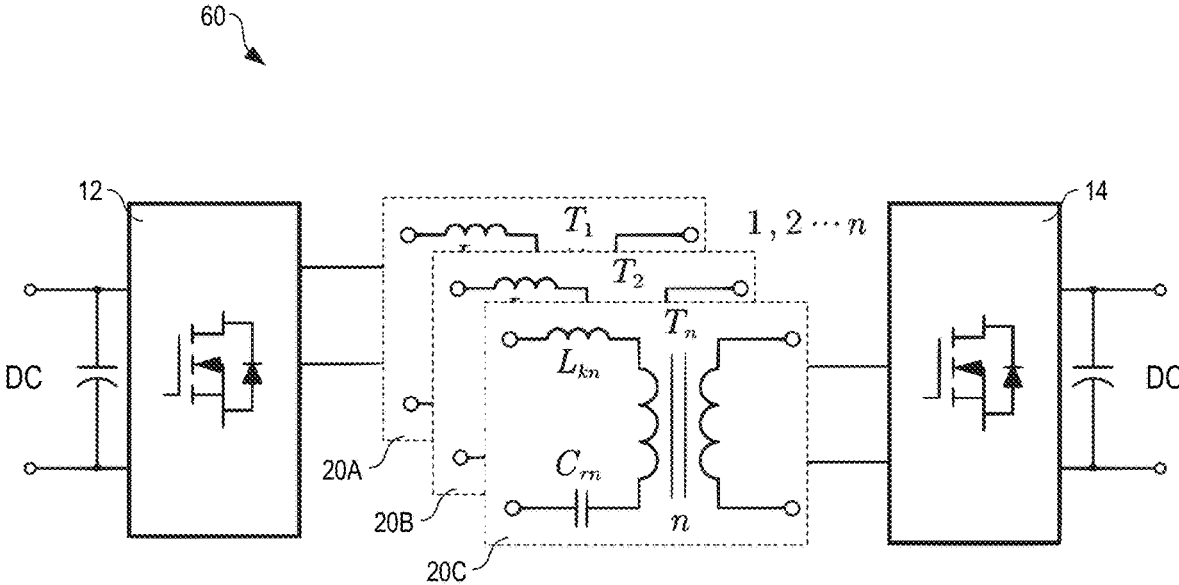
FIG. 8 illustrates an example of a DCX with parallel transformers according to aspects of the embodiments.

FIG. 8 illustrates an example of a DCX 60 with parallel transformers 20A-20C according to aspects of the embodiments. The DCX 60 is similar to the DCX 10 shown in FIGS. 1, 2, and 6, but the DCX 60 includes a parallel arrangement of n transformers 20A-20C between the input switching bridge 12 and the output switching bridge 14. The parallel arrangement of the transformers 20A-20C can be relied upon to increase the power handling capacity and density of the DCX 60 as compared to the DCX 10.

Paralleling the transformers 20A-20C is challenging in SRC-based DCX converters, however. Even when the transformers 20A-20C are each manufactured according to the same design, small differences in the resonant tanks among the transformers 20A-20C will lead to current-sharing disparities among the parallel transformers 20A-20C. The differences in the resonant tanks can be attributed to variations among the $L_k$ inductances, $C_r$ capacitances, and other parasitic, mechanical, and electrical differences among the transformers 20A-20C due to manufacturing tolerances. Additionally, the $L_k$ inductances, $C_r$ capacitances, and other electrical characteristics of the resonant tanks can vary based on differences in the operating temperatures among the transformers 20A-20C and other factors. The differences in the resonant tanks also makes it particularly difficult to operate the DCX 60 at a switching frequency $f_s$ that matches to a combined resonant frequency $f_r$ of the parallel transformers 20A-20C.

Figure 9:
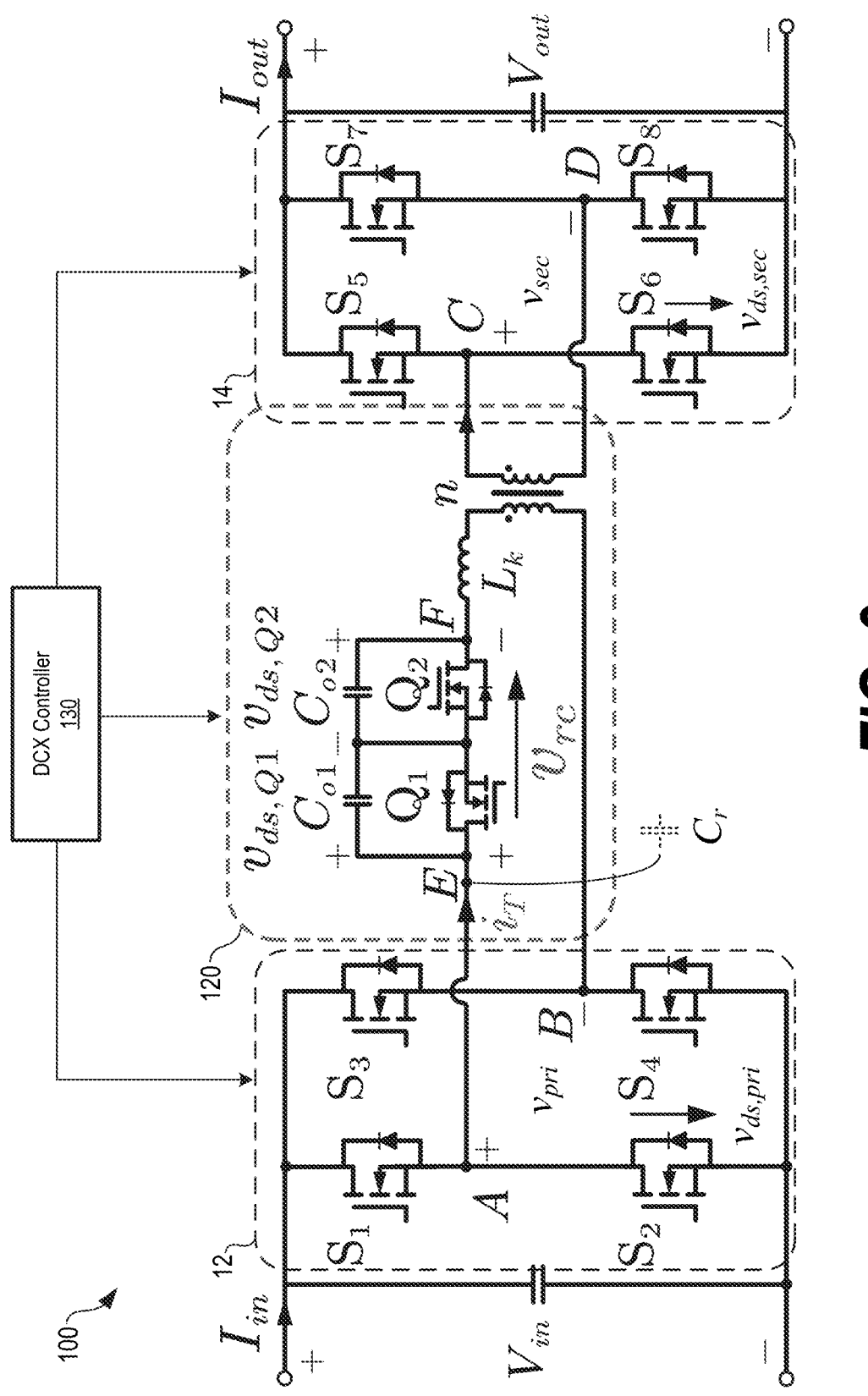
FIG. 9 illustrates an example of a DCX with a resonant commutation electronic-embedded transformer (RC EET) according to aspects of the embodiments.

To address the current-sharing issues in the DCX 60 and provide a better solution for DCX converters capable of higher power handling capacity and power density, the DCX-based power converter embodiments described herein include RC EETs. FIG. 9 illustrates an example of a DCX power converter 100 with an RC EET 120 according to aspects of the embodiments. The DCX 100 includes the first or input switching bridge 12, the second or output switching bridge 14, the RC EET 120, and a DCX controller 130. For including the RC EET 120, the DCX power converter 100 can also be referred to herein as an RC EET-DCX ("RC EET-DCX 100").

The RC EET-DCX 100 is illustrated as a representative example. The RC EET-DCX 100 can vary as compared to that shown. For example, the RC EET-DCX 100 can include other components that are not illustrated in FIG. 9, and the RC EET-DCX 100 can omit one or more of the components that are illustrated in FIG. 9. The switching devices, transformers, controllers, and other components in the RC EET-DCX 100 can be embodied as described below or using other suitable devices (e.g., other types of transistors, transformers, controllers, etc.), as the RC EET-DCX 100 is not limited to being implemented with any particular type or style of electronic components.

As shown, the first or input switching bridge 12 includes switching devices $S_1$-$S_4$, and the second or output switching bridge 14 includes switching devices $S_5$-$S_8$. The RC EET 120 includes a primary winding, a secondary winding, a resonant inductor $L_k$, and a bidirectional coupling switch bridge in series with the resonant inductor $L_k$. The bidirectional coupling switch bridge of the RC EET-DCX 100 includes switching devices $Q_1$ and $Q_2$ and capacitors $C_{o1}$ and $C_{o2}$. In the RC EET-DCX 100, the RC EET 120 replaces the transformer 20 of the DCX 10 shown in FIG. 6. Thus, the RC EET 120 is similar to the transformer 20 of the DCX 10 but also includes the bidirectional coupling switch bridge.

Because the RC EET 120 replaces the transformer 20 of the DCX 10 shown in FIG. 6, the resonant capacitor $C_r$ of the transformer 20 is not shown in FIG. 9. Instead, the capacitors $C_{o1}$ and $C_{o2}$ provide a substitute for the resonant capacitor $C_r$. However, in some cases, the inductance of the resonant inductor $L_k$ can be relatively large (e.g., in some wireless charging applications, etc.). Thus, in some embodiments, the RC EET-DCX 100 can also include an additional resonant capacitor $C_r$ coupled in series with the bidirectional coupling switch bridge. The additional resonant capacitor $C_r$ can be coupled in series with the switching devices $Q_1$ and $Q_2$ and capacitors $C_{o1}$ and $C_{o2}$, such as in series between the nodes or point "A" and "E" as shown in FIG. 9. For large values of $L_k$, the additional $C_r$ can cancel part of the inductance of the resonant inductor $L_k$, and the capacitors $C_{o1}$ and $C_{o2}$ can cancel the remaining inductance of the resonant inductor $L_k$.

FIG. 9 also identifies $V_{in}$ and $V_{out}$, which denote the input and output voltages for the RC EET-DCX 100, respectively, and $I_{in}$ and $I_{out}$, which denote the input and output currents for the RC EET-DCX 100, respectively. Additionally, $v_{pri}$ corresponds to the voltage across the A and B nodes in the input switching bridge 12, and $v_{sec}$ corresponds to the voltage across the C and D nodes in the output switching bridge 14. The drain-to-source voltage across $Q_1$ is denoted as $v_{ds,Q1}$, and the drain-to-source voltage across $Q_2$ is denoted as $v_{ds,Q2}$. The voltage $v_{rc}$ denotes the output voltage across the bidirectional coupling switch bridge or the output resonant voltage across point E and F in FIG. 9, and its peak value is $v_{rc,peak}$. $L_k$ can be embodied as the leakage inductance of the transformer in the RC EET 120, and $i_T$ represents the current flowing through the RC EET 120. The magnetizing inductance in the RC EET 120 is disregarded as it exclusively pertains to the ZVS of the switching bridges 12 and 14 and is unrelated to the ZVS of the bidirectional coupling switch bridge in the RC EET 120.

The bidirectional coupling switch bridge includes switching devices $Q_1$ and $Q_2$ and capacitors $C_{o1}$ and $C_{o2}$. The switching devices $Q_1$ and $Q_2$ are arranged as a bidirectional switch in series with the resonant inductor $L_k$. The switching devices $Q_1$ and $Q_2$ can be embodied as switching transistors and, in some cases, can be embodied as a monolithic bidirectional switch. In some cases, the capacitors $C_{o1}$ and $C_{o2}$ can be embodied as the body capacitances of the switching devices $Q_1$ and $Q_2$. In other cases, $C_{o1}$ and $C_{o2}$ can be embodied as capacitors separate from the switching devices $Q_1$ and $Q_2$, or $C_{o1}$ and $C_{o2}$ can be embodied as a combination of the body capacitances of the switching devices $Q_1$ and $Q_2$ and capacitors separate from the switching devices $Q_1$ and $Q_2$. Because the voltages present across the switching devices $Q_1$ and $Q_2$ are lower than the voltages present across the switching devices $S_1$-$S_8$, the switching devices $Q_1$ and $Q_2$ can be much smaller and integrated as part of the design of the RC EET 120 as a module. The switching devices $Q_1$ and $Q_2$ can be operated based on drive control signals provided to the gates of the switching devices $Q_1$ and $Q_2$ from the DCX controller 130.

In the bidirectional coupling switch bridge, $C_{o1}$ and $C_{o2}$ are two symmetric parallel capacitors, such that $C_{o1}=C_{o2}$. The voltage $v_{rc}$ denotes the output resonant voltage across point E and F in FIG. 9 and follows the following expression:

$$v_{rc} = Q_1 \cdot v_{ds,Q1} - Q_2 \cdot v_{ds,Q2} \quad (Q_{1(2)} = 0 \text{ OFF}/1 \text{ ON}). \qquad (1)$$

In the steady state, the relationship between $V_{in}$ and $V_{out}$, $I_{in}$ and $I_{out}$, and $v_{pri}$ and $v_{sec}$ can be given in Eq. (2) as:

$$\begin{cases} V_{in} = n \cdot V_{out} \\ I_{in} = I_{out}/n \\ v_{pri} = n \cdot v_{sec} \end{cases} \qquad (2)$$

The DCX controller 130 can be embodied as processing circuitry, including memory, configured to control the operation of the RC EET-DCX 100, with or without feedback. The DCX controller 130 can be embodied as any suitable type of controller, such as a PID controller, a PI controller, or a multi-pole multi-zero controller, among others, to control the operations of the RC EET-DCX 100. The DCX controller 130 can be realized using a combination of processing circuitry and referenced as a single controller. It should be appreciated, however, that the DCX controller 130 can be realized using a number of controllers, control circuits, drivers, and related circuitry.

In some cases, the DCX controller 130 can receive a metric or measure of one or more of the input voltage $V_{in}$, the input current $I_{in}$, the output voltage $V_o$, output current $I_{out}$ or power provided to a load $R_L$ (not shown in FIG. 9), the voltage $v_C$ across the output of the coupling switch bridge 120, the operating frequency fs, or other operating metrics of the RC EET-DCX 100 as inputs, along with external control inputs.

The DCX controller 130 is configured to generate gate drive or switching control signals for the switching devices $S_1$-$S_4$ and $S_5$-$S_8$ at a switching frequency $f_s$. The switching control signals direct the operation of the switching devices $S_1$-$S_4$ and $S_5$-$S_8$ to transfer power between the input and the output of the RC EET-DCX 100. The DCX controller 130 is also configured to generate gate drive control signals for the switching devices $Q_1$ and $Q_2$ in the bidirectional coupling switch bridge, as described below.

In one example, the switching devices $S_1$, $S_4$, $S_5$, and $S_8$ in the switch bridges 12 and 14 can share a first control signal provided by the DCX controller 130, and the switching devices $S_2$, $S_3$, $S_6$, and $S_7$ in the switch bridges 12 and 14 can share a second control signal provided by the DCX controller 130, where the first and second control signals have complimentary "on" and "off" timings. The DCX controller 130 can generate the switching control signals based, at least in part, on the operating metrics of the RC EET-DCX 100, as feedback, although the RC EET-DCX 100 can also operate with simple open loop control. The duty cycle of the switching control signals can be varied by the DCX controller 130 in some cases to direct the amount of power transferred by the DCX 10.

The DCX controller 130 can also generate drive control signals for the switching devices $Q_1$ and $Q_2$ in the bidirectional coupling switch bridge. The EET-DCX described in the '353 application includes a coupling switch bridge. The switching devices $Q_2$ and $Q_3$ in the coupling switch bridge of the EET-DCX share a first phasing drive control signal provided by a DCX controller, and the switching devices $Q_1$ and $Q_4$ share a second phasing drive control signal provided by the DCX controller, where the first and second phasing drive control signals have complimentary "on" and "off" timings. In that implementation, the EET-DCX is operated with triangular transformer currents with a higher rms value as compared to the sinusoidal currents in LLC or CLLC-based DCX converters.

In the embodiments described herein, the DCX controller 130 is configured to generate drive control signals for the switching devices $Q_1$ and $Q_2$ in the RC EET 120 for quasi-trapezoidal current modulation. Through the implementation of quasi-trapezoidal current modulation using the bidirectional coupling switch bridge according to the embodiments, RC EET-DCX power converters can effectively reduce rms currents as compared to when triangular current modulation is used. The use of quasi-trapezoidal current modulation can reduce rms currents as compared to the triangular transformer currents described in the '353 application. The quasi-trapezoidal current modulation techniques described herein contribute to a reduction of total conduction loss, including reduced switching losses in the LV switching devices $Q_1$ and $Q_2$ and reduced switching losses in the HV switching devices $S_1$-$S_4$ and $S_5$-$S_8$ of the switching bridges 12 and 14. The proposed quasi-trapezoidal current modulation techniques also retain the advantages of natural current sharing, optimal operation at any frequency, load-independent voltage gain, simple open-loop control, full load range ZVS, and other benefits.

Figure 10:
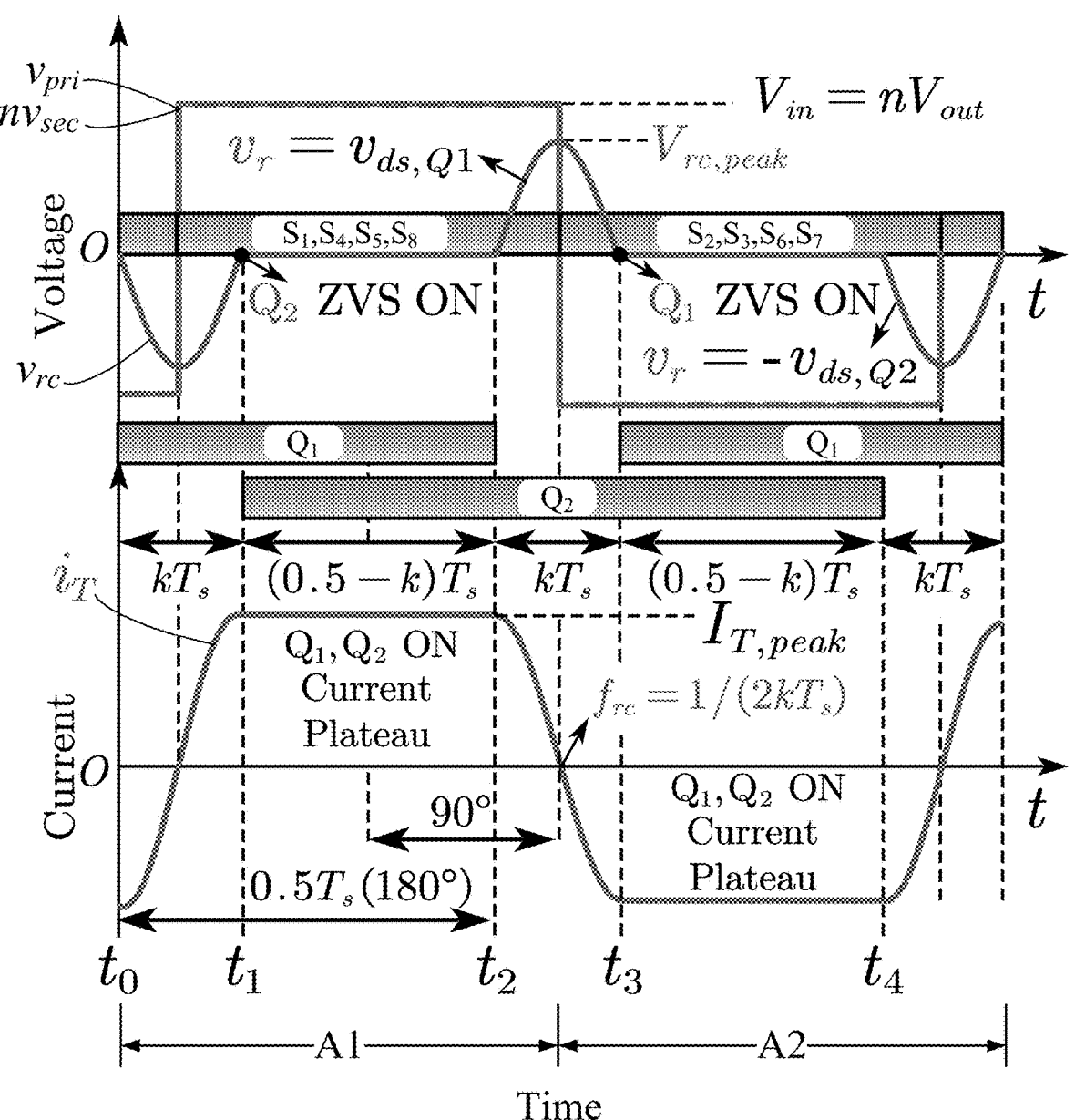
FIG. 10 illustrates example control timings for control of the RC EET-DCX shown in FIG. 9 according to aspects of the embodiments.

FIG. 10 illustrates example control timings for the RC EET-DCX 100 shown in FIG. 9, as generated by the DCX controller 130. As shown, both the switching bridges 12 and 14 have the same driving signals, which ensures that $v_{pri}$ is in phase of $v_{sec}$. More particularly, the DCX controller 130 is configured to generate gate switching control signals to turn the switching devices $S_1$, $S_4$, $S_5$, and $S_8$ on during the time period A1 and off during the time period A2. The DCX controller 130 is also configured to generate gate switching control signals to turn the switching devices $S_2$, $S_3$, $S_6$, and $S_7$ on during the time period A2 and off during the time period A1.

The DCX controller 130 is also configured to generate gate drive control signals for the switching devices $Q_1$ and $Q_2$ in the bidirectional coupling switch bridge of the RC EET 120. The gate drive control signals of the switching devices $Q_1$ and $Q_2$ both have a 1-k duty cycle, and they have a 180-degree (half cycle) phase shift. Compared to the gate switching control signals for the switching bridges 12 and 14, the gate drive control signal for $Q_1$ leads a 90-degree phase shift as compared to the gate switching control signals for the switching devices $S_1$, $S_4$, $S_5$, and $S_8$ Similarly, the gate drive control signal for $Q_2$ leads a 90-degree phase shift as compared to the gate switching control signals for the switching devices $S_2$, $S_3$, $S_6$, and $S_7$. Based on this driving logic provided by the DCX controller 130 and Eq. (2), it can be observed that when $v_{pri}$ equals $nv_{sec}$, only the voltage $v_{rc}$ will be utilized to drive $L_k$, resulting in the generation of a quasi-trapezoidal current waveform as shown in FIG. 10. In a half cycle (e.g., from $t_0$ to $t_2$), during the current commutation from $t_0$ to $t_1$ ($kT_s$), only one switch $Q_1$ is on, and $C_{o2}$ will resonate with $L_k$ at frequency $f_{rc}$, as:

$$f_{rc} = \frac{1}{2\pi\sqrt{L_k C_{o1(2)}}}. \tag{3}$$

If $L_k$ and Co/$C_{o2}$ can be designed to resonate a half cycle during $kT_s$, another relationship between $f_{rc}$ and $f_s$ can be given as:

$$f_{rc} = \frac{1}{2k} \cdot f_s \ k \in (0, 0.5]. \tag{4}$$

If the resonant frequency $f_{rc}$ is designed or set based on Eqs. (3) and (4), this half-cycle resonance between $C_{o1}$/$C_{o2}$ and $L_k$ can be utilized to realize transformer current commutation during $t_0$-$t_1$ or $t_2$-$t_3$ as shown in FIG. 10. As for the "current plateau" period from $t_1$ to $t_2$ ((0.5−k)$T_s$), both $Q_1$ and $Q_2$ are on, and $v_{rc}$ is equal to 0. Due to no voltage across $L_k$, the transformer current $i_T$ is flat as shown in FIG. 10. Moreover, the ZVS turn-on for $Q_1$ and $Q_2$ will be achieved at the end of resonance ($t_1$ or $t_3$) because $v_{ds,Q2}$ and $v_{ds,Q1}$ will drop to zero. This is distinguished from the EET-DCX described in the '353 application, which requires a full bridge to realize current commutation, and the RC EET-DCX power converter current commutation only requires one bidirectional switch.

Thus, the DCX controller 130 is configured to generate gate drive control signals for the switching devices $Q_1$ and $Q_2$ in the bidirectional coupling switch bridge to achieve a quasi-trapezoidal current $i_T$. Compared to the control signals for the switching bridges 12 and 14, the gate drive control signal for $Q_1$ leads a 90-degree phase shift as compared to the switching control signals for the switching devices $S_1$, $S_4$, $S_5$, and $S_8$ Similarly, the gate drive control signal for $Q_2$ leads a 90-degree phase shift as compared to the switching control signals for the switching devices $S_2$, $S_3$, $S_6$, and $S_7$. With this 90-degree phase shift, the bidirectional coupling switch bridge can cancel the impedance produced by the leakage inductance $L_k$ by the coupling of the voltage $v_{rc}$ voltage in series with the leakage inductance $L_k$, at any switching frequency $f_s$.

Figure 11:
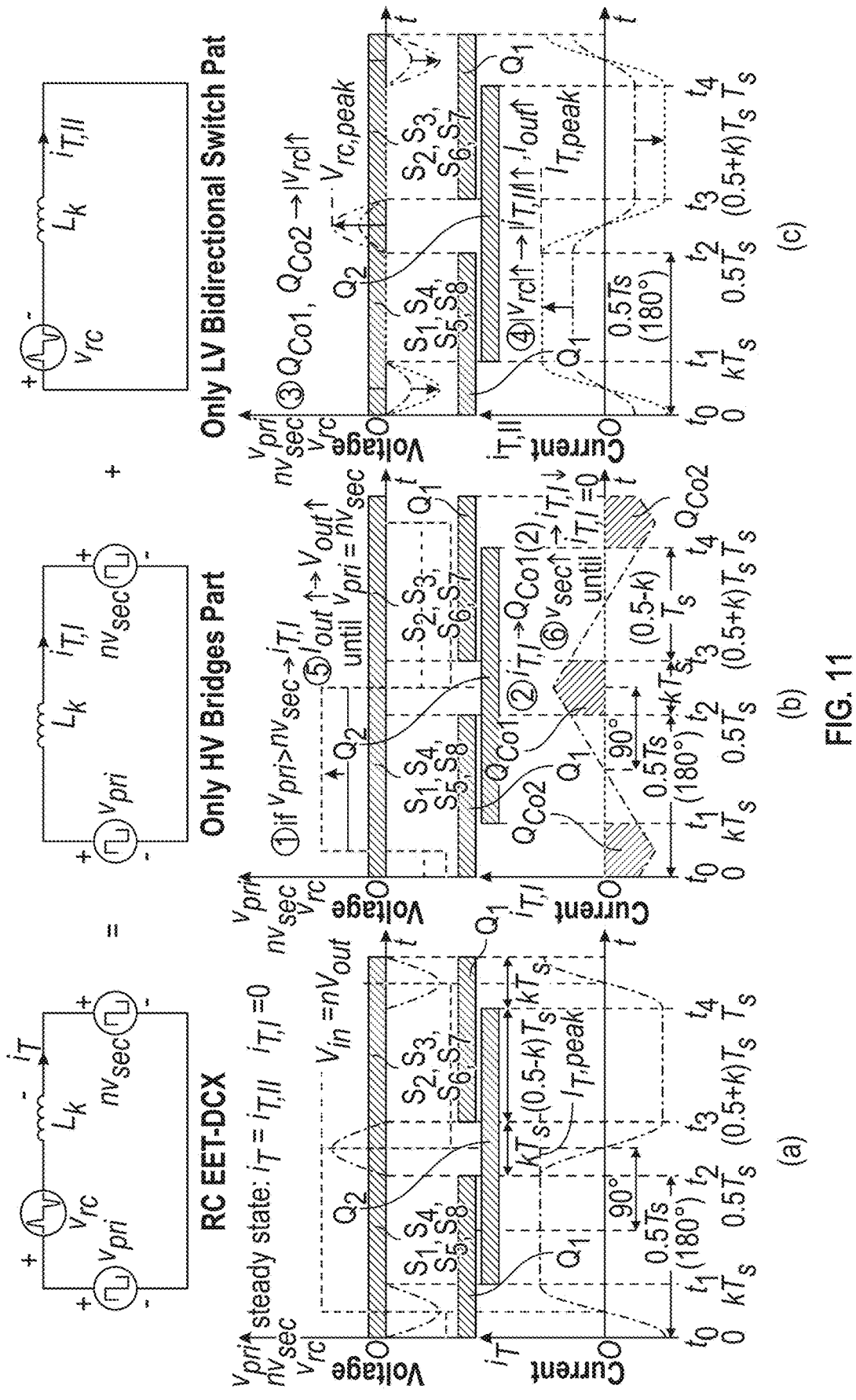
FIG. 11 illustrates the independent voltage gain of the RC EET-DCX shown in FIG. 9 according to aspects of the embodiments.

To illustrate the robust independent voltage gain of the RC EET-DCX 100, FIG. 11 shows a procedure with a certain load. Based on the superposition principle, the RC EET-DCX 100 shown in FIG. 9 can be decomposed of two parts, including the HV switching bridges 12 and 14 and the LV bidirectional coupling switch bridge in the RC EET 120. The operation principle of the robust load-independent voltage gain can be explained as six steps.

In step 1, assuming $V_{in}$ is larger than $nV_{out}$ as shown in (b) of FIG. 11, the voltage difference $(V_{in}-nV_{out})$ will be applied to $L_k$ directly, and the triangular current $i_{T,I}$ will have a 90-degree phase shift from $v_{pri}$ or $v_{sec}$. Due to this 90-degree phase shift, there is no real power delivered to the receiving side by $i_{T,I}$. In step 2, since the current $i_{T,I}$ in (b) of FIG. 11 is in phase of the voltage $v_C$ (c) of FIG. 11, it will charge the capacitors $C_{o1}$ and $C_{o2}$ alternatively. For example, from $t_0$ to $t_1$, the current $i_{T,I}$ keeps negative as shown in (b), and at the same time only LV switch $Q_1$ is ON ($Q_2$ is OFF). Therefore, the electric charge $Q_{Co2}$ will be charged to $C_{o2}$. As for another half period from $t_2$ to $t_3$, a positive $i_{T,I}$ will generate $Q_{Co1}$ to charge the capacitor $C_{o1}$. In one cycle, $Q_{Co1}$ will be equal to $Q_{Co2}$ and always keeps the waveform $v_{rc}$ positive and negative symmetric.

In step 3, if $V_{in}$ is larger than $V_{out}$, $Q_{Co1}$ and $Q_{Co2}$ generated from the current $i_{T,I}$ will always increase amplitude of $v_{rc}$ during the whole period, as:

$$i_{T,I} \rightarrow Q_{Co1}, Q_{Co2} \rightarrow |v_{rc}| \uparrow. \tag{5}$$

In step 4, as depicted in (c) of FIG. 11, with only one voltage source excitation $v_{rc}$, the current $i_{T,II}$ is quasi-trapezoidal and can be derived as:

$$i_{T,II}(t) = \begin{cases} -I_{T,peak} \cdot \cos(2\pi f_{rc} \cdot t) & t \in [0, kT_s] \\ I_{T,peak} & t \in [kT_s, 0.5T_s] \end{cases}, \tag{6}$$

where $I_{T,peak}$ is the peak value of $i_T$, and the range of k is from 0 to 0.5. With an increase of $v_{rc}$ from Eq. (5), the amplitude of current $i_{T,II}$ will become larger as shown in (c) of FIG. 11. On the other hand, the power $P_{T,II}$ delivered to the receiving side by $i_{T,II}$ can be given as:

$$P_{T,II} = \int_0^{T_s} n \cdot v_{sec}(t) \cdot i_{T,II}(t). \tag{7}$$

Since $v_{sec}$ is always in phase of $i_{T,II}$, with a larger $i_{T,II}$ shown in the dash line, more real power $P_{T,II}$ will be delivered to the receiving side.

In step 5, if the receiving power increases with a certain load, the corresponding output voltage $V_{out}$ will increase until $nV_{out}$ is equal to $V_{in}$, as:

$$I_{out} \uparrow \rightarrow V_{out} \uparrow, |v_{sec}| \uparrow \text{ until } n \cdot V_{out} = V_{in}. \tag{8}$$

In step 6, assuming $V_{in}$ is constant, an increasing $V_{out}$ will lead to a smaller current $i_{T,I}$ until $nV_{out}$ is equal to $V_{in}$.

The overall operation of the RC EET-DCX 100 with the RC EET 120, as shown in FIG. 11, can be expressed in Eq. (9) as:

$$\begin{cases} V_{in} > nV_{out} & i_{T,II} \rightarrow |v_{rc}| \uparrow \rightarrow I_{out} \uparrow \rightarrow V_{out} \uparrow \\ V_{in} = nV_{out} & i_{T,II} = 0 \rightarrow const \; V_{rc,peak}, I_{T,peak}, I_{out}, V_{out} \; . \\ V_{in} < nV_{out} & i_{T,II} \rightarrow |v_{rc}| \downarrow \rightarrow I_{out} \downarrow \rightarrow V_{out} \downarrow \end{cases} \tag{9}$$

When $nV_{out}$ is equal to $V_{in}$, the current $i_{T,I}$ will be equal to zero, and the peak voltage and current values $V_{rc,peak}$ and $I_{T,peak}$ should keep as constant, which means the RC EET-DCX 100 has entered the steady state. This analysis is based on $V_{in}$ being larger than $nV_{out}$. On the contrary, if $V_{in}$ is smaller than $nV_{out}$, with the similar analysis from Eq. (4)-(8), $i_{T,II}$ will discharge the capacitors $C_{o1}$ and $C_{o2}$ during $t_0$-$t_1$ and $t_2$-$t_3$ alternatively and lead to a drop of the output current $I_{out}$. With a certain load, a smaller $I_{out}$ will decrease $V_{out}$ until $V_{in}$ is equal to $nV_{out}$.

At the steady state, with turns ratio n, the input voltage $V_{in}$ should be equal to $nV_{out}$ based on the analysis in Eq. (9). Therefore, as in the EET-DCX described in the '353 application, the proposed RC EET-DCX also maintains the robust load-independent voltage gain from Eq. (2).

As for the current $i_T$, component $i_{T,I}$ should be equal to 0 at the steady state, otherwise this current will continue generate $Q_{Co1}$ and $Q_{Co2}$ as shown in (b) of FIG. 11. Therefore, the current $i_T$ in steady state should be equal to $i_{T,II}$, as follows:

$$\begin{cases} i_{T,I} = 0 \\ i_T = i_{T,II} \end{cases}. \tag{10}$$

Since this steady state is a stable equilibrium point, no extra control is required.

Figure 12:
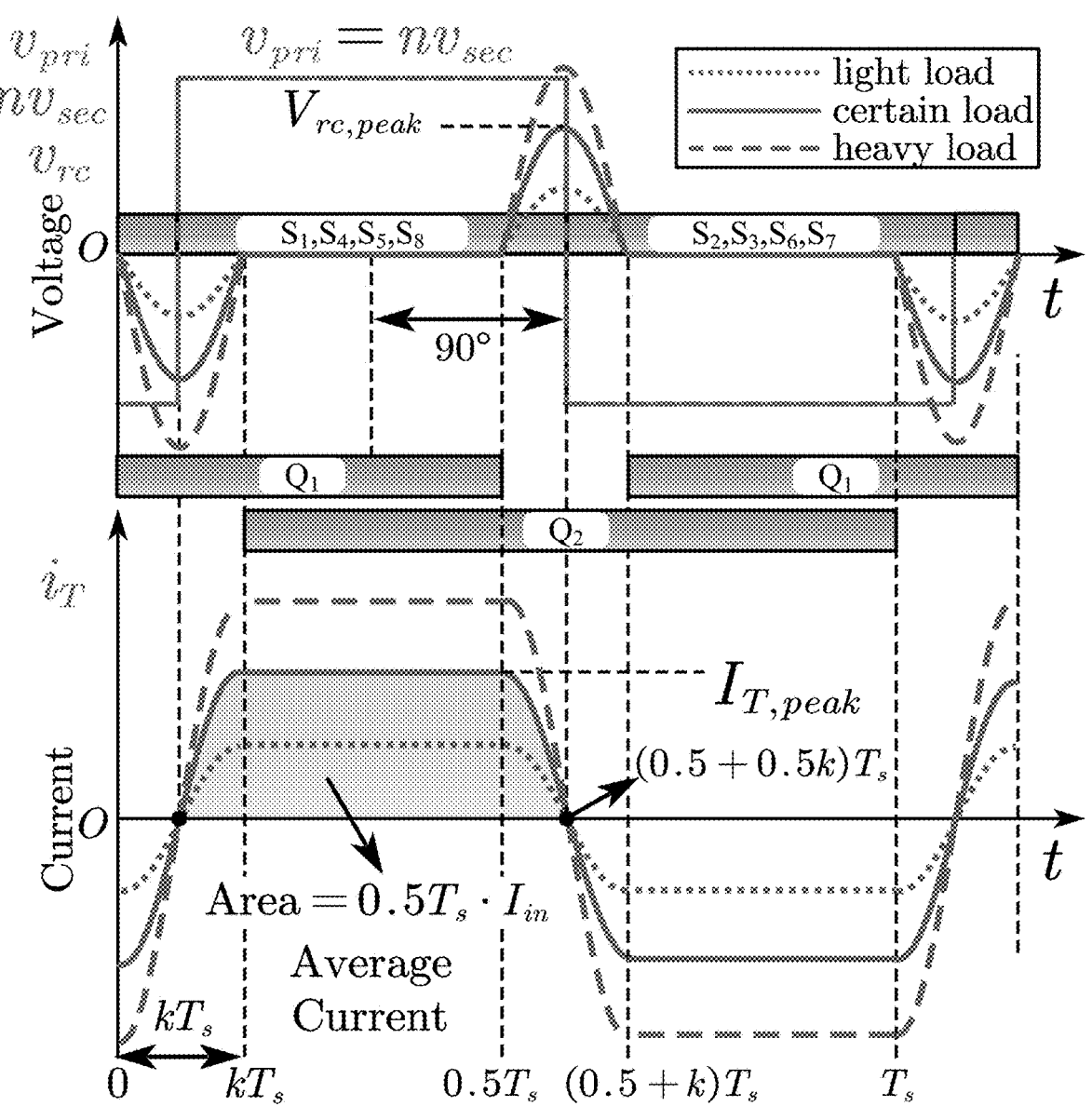
FIG. 12 illustrates steady state waveforms of the RC EET-DCX shown in FIG. 9 under different load conditions according to aspects of the embodiments.

FIG. 12 illustrates steady state waveforms of the RC EET-DCX 100 shown in FIG. 9 under different load conditions. Since the transformer current $i_T$ is in phase of terminal voltages $v_{pri}$ and $v_{sec}$ at the steady state, the transformer current $i_T$ will be dedicated to real power transfer. With different loads, the amplitude of the quasi-trapezoidal current $i_T$ will be regulated via $v_{rc}$ as shown in FIG. 12. Since $i_T$ is equal to $i_{T,II}$ in the steady state, the time-domain expression of $i_T(t)$ can be directly found in Eq. (6). On the other hand, the input DC current $I_{in}$ is equal to the average value of current $i_T$, as follows:

$$I_{in} = \text{average current} = \frac{2}{T_s} \int_{0.5kT_s}^{(0.5+0.5k)T_s} i_T(t) \cdot dt. \tag{11}$$

From Eqs. (6) and (11), the relationship between $I_{T,peak}$ and $I_{in}$ can be given as:

$$I_{T,peak} = \frac{\pi}{4 \cdot k + (1 - 2 \cdot k) \cdot \pi} \cdot I_{in}. \tag{12}$$

Following Eqs. (6) and (12), the transformer rms current $i_{T,rms}$ can also be derived as:

US 12,658,809 B2

15

16

$$I_{T,rms} = \frac{1}{T_s}\sqrt{\int_0^{T_s} i_T^2(t)\,dt} \qquad (13)$$
$$= \frac{\sqrt{1-k}\cdot\pi}{(1-2\cdot k)\cdot\pi+4\cdot k}\cdot I_{in}$$

As for the resonant voltage $v_{cr}$ in the steady state, the time-domain expression of $v_{cr}(t)$ can be given as:

$$v_{cr}(t) = \begin{cases} -V_{cr,peak}\cdot\sin(2\pi f_{rc}\cdot t) & t\in[0, kT_s] \\ 0 & t\in[kT_s, 0.5\,T_s] \end{cases}, \qquad (14)$$

where the peak voltage value $V_{cr,peak}$ can be derived as:

$$V_{cr,peak} = L_k\cdot\frac{di_T(t)}{dt}\Big|_{t=(0.5+0.5\,k)T_s} \qquad (15)$$
$$= \frac{\pi^2}{k\cdot(4\cdot k+(1-2\cdot k)\cdot\pi)}\cdot f_s\cdot L_k\cdot I_{in}$$

From Eq. (15), the peak voltage $V_{rc,peak}$ applied on the LV bidirectional switch $Q_1$ and $Q_2$ is proportional with switching frequency $f_s$, leakage inductance $L_k$, and input DC current $I_{in}$, as follows:

$$V_{cr,peak} \propto f_s, L_k, I_{in}. \qquad (16)$$

With a pre-determined $I_{in}$, $f_s$, and k, the transformer leakage inductance $L_k$ should be minimized because it can reduce the voltage stress on the LV bidirectional switch. With devices having smaller voltage ratings, the bidirectional switch can be easily embedded into the RC EET 120 as a module. For instance, when $I_{in}$ is 10 A, $f_s$ is 200 kHz, k is 0.3, $L_k$ is 300 nH, the voltage stress $V_{rc,peak}$ on the bidirectional switch can be derived as only 8 V from Eq. (15). Notably, the voltage stress $V_{rc,peak}$ is unrelated to input or output voltage $V_{in(out)}$ from Eq. (15), which means the RC EET-DCX 100 can be adopted in high voltage applications. Even if the input and output voltages are large, a LV bidirectional switch can still be selected. Overall, since $V_{in}$ is equal to $nV_{out}$ at the steady state, the resonant voltage $v_{rc}$ will be directly applied to $L_k$, which means the voltage drop on $L_k$ is fully compensated by this embedded LV bidirectional switch.

Figure 13:
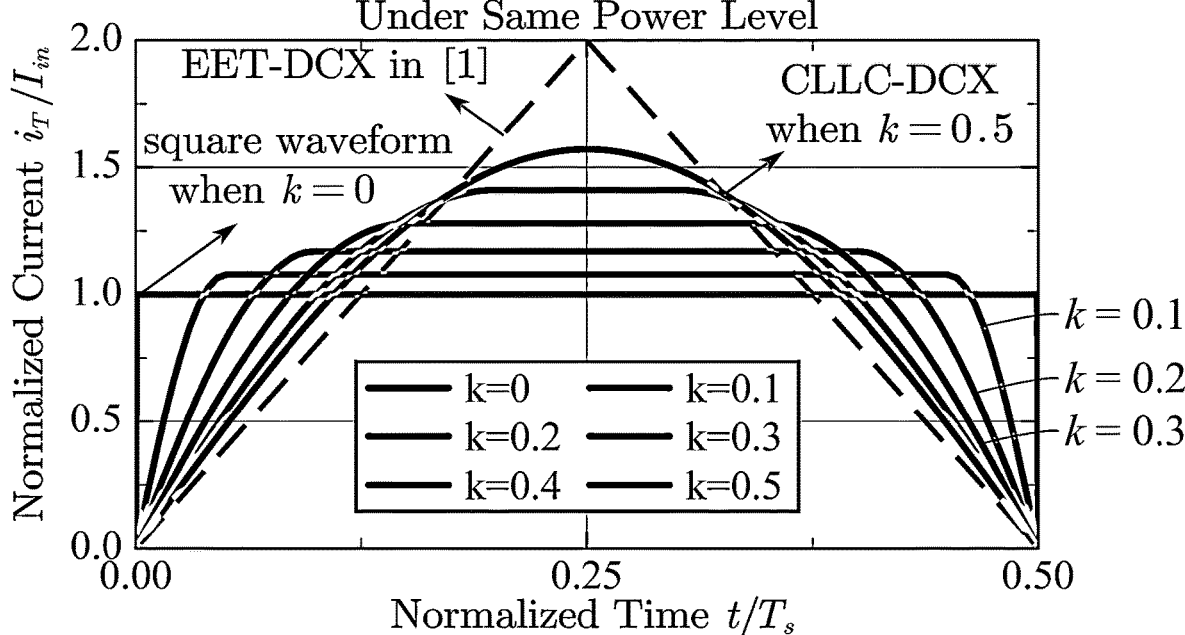
FIG. 13 illustrates normalized transformer current with different commutation coefficients for the RC EET-DCX shown in FIG. 9 according to aspects of the embodiments.

Based on the time-domain expression of $i_T(t)$ from Eq. (6), FIG. 13 illustrates the normalized transformer current $i_T/I_{in}$ in the RC EET-DCX 100 with different commutation coefficients k. Under the same power level, the current $i_T$ is normalized based on input dc current $I_{in}$. When $0<k<0.5$, the transformer current $i_T$ in the RC EET 120 exhibits a quasi-trapezoidal waveform composed of two parts, including (1) a resonance part during the current commutation and (2) the "current plateau". When k is equal to 0, the current waveform changes to the ideal square waveform. Conversely, when k is equal to 0.5, the resonant current will occupy the whole period and the "current plateau" will disappear, which means the RC EET-RC EET-DCX 100 will transition to the traditional resonant CLLC-DCX when k=0.5. Additionally, for comparison purposes, the triangular current from the EET-DCX described in the '353 application is depicted as a dashed line in FIG. 13, assuming the same power rating.

Figure 14:
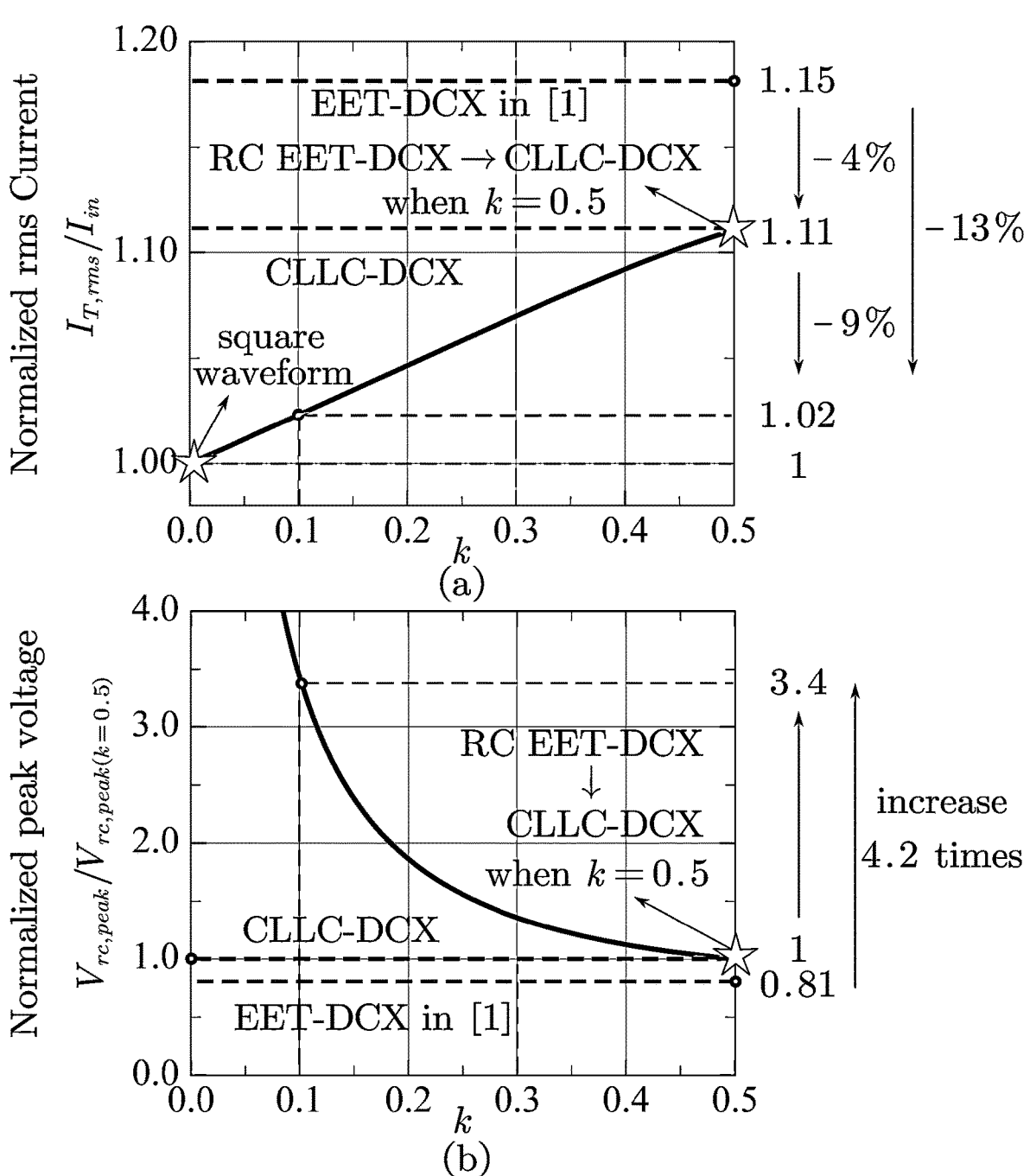
FIG. 14 illustrates normalized root mean square transformer current and normalized peak voltage with different commutation coefficients for the RC EET-DCX shown in FIG. 9 according to aspects of the embodiments.

Following Eq. (13), (a) in FIG. 14 illustrates normalized rms current $I_{T,rms}$ based on $I_{in}$ with different commutation coefficients k. Comparing it with the sinusoidal current observed in a CLLC-DCX or k=0.5 case, the rms current can be reduced by 9% and 11% for k=0.1 and 0, respectively. Notably, for k=0.1, the rms current is significantly reduced by 13% as compared to the EET-DCX described in the '353 application.

On the other hand, (b) in FIG. 14 represents the normalized peak voltage $V_{rc,peak}$ based on $V_{rc,peak}$ with k=0.5 from Eq. (15). One drawback of the RC EET-DCX and corresponding quasi-trapezoidal current modulation is that $V_{rc,peak}$ increases when k decreases. Theoretically, if k can be reduced to 0, the square waveform transformer current would be optimal. However, based on Eq. (15), when k is close to 0, $V_{cr,peak}$ will increase dramatically. For example, when k=0.1, $V_{rc,peak}$ increases by 4.2 times as compared with the EET-DCX described in the '353 application. Thus, a trade-off exists, because when k approaches 0, the quasi-trapezoidal current becomes more like a square waveform with a smaller rms current as shown in FIG. 13, but it results in an increase in $V_{rc,peak}$ across the bidirectional switch as shown in (b) in FIG. 14. However, in practical scenarios, $V_{rc,peak}$ is typically very small. For example, when $I_{in}$ is 10 A, $f_s$ is 200 kHz, k is 0.1, $L_k$ is 300 nH, the voltage stress $V_{rc,peak}$ on bidirectional can be derived as only 20 V from Eq. (15). This indicates that the increased $V_{rc,peak}$ is acceptable when it leads to a reduction in rms current.

The RC EET-DCX 100 with its related quasi-trapezoidal current modulation reduces the total number of active devices needed from 4 in the in the EET-DCX to 2 (e.g., if discrete $Q_1$ and $Q_2$ are used) or 1 (e.g., if a monolithic bidirectional switch is used). Additionally, the corresponding quasi-trapezoidal current can reduce the total conduction loss through a smaller rms current, when considering the total conduction loss in the HV switching bridges 12 and 14, in the LV bidirectional coupling switch bridge of the RC EET 120, and in the transformer windings of the transformer of the RC EET 120.

Figure 15A:
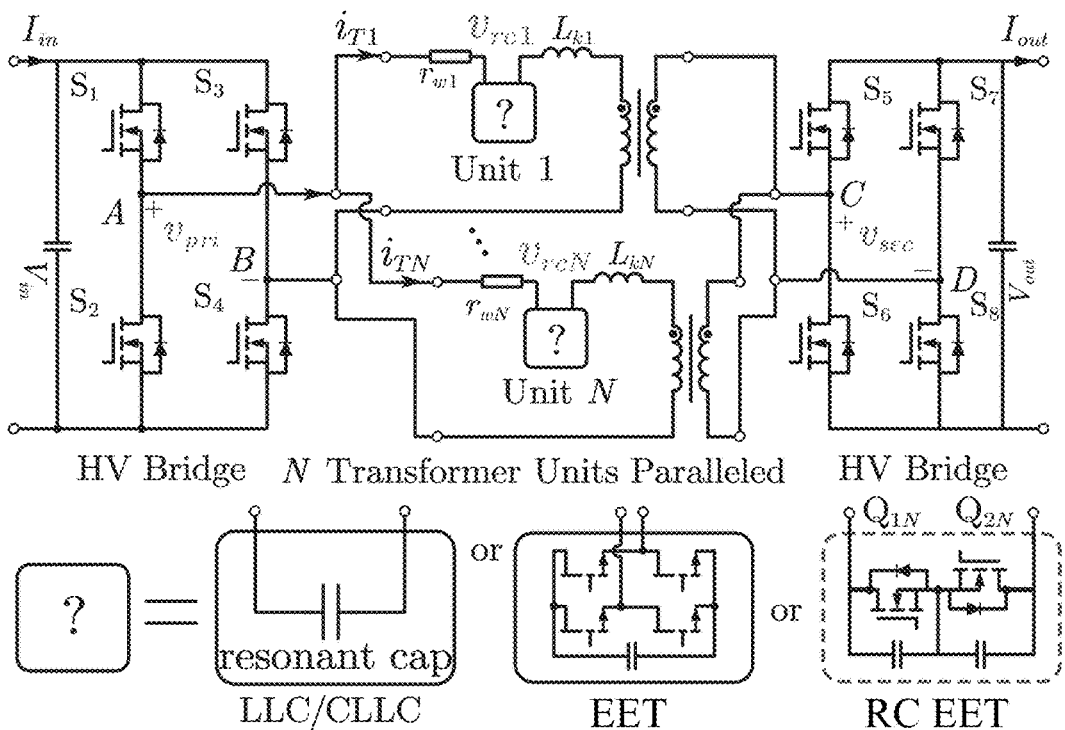
FIG. 15A illustrates three transformer-level parallel solutions, including a CLLC, a EET-DCX, and an RC EET-DCX according to aspects of the embodiments.
Figure 15B:
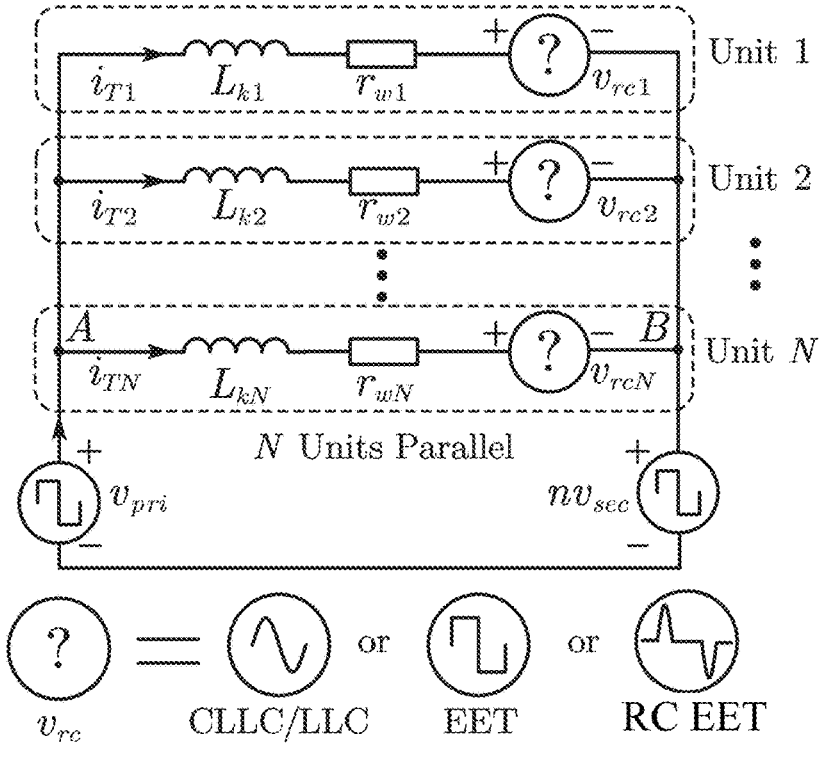
FIG. 15B illustrates simplified equivalent circuits for the parallel solutions shown in FIG. 15A according to aspects of the embodiments.

Due to higher power density, transformer-level parallel solutions are more desirable than converter-level parallel solutions when the power rating of DCX power converts are scaled up. FIG. 15A illustrates three transformer-level parallel solutions, including a CLLC-DCX parallel solution, a EET-DCX parallel solution, and an RC EET-DCX parallel solution. FIG. 15B illustrates simplified equivalent circuits for the parallel solutions shown in FIG. 15A. $i_{T1-N}$ are the transformer currents among each paralleled unit. $r_{w1-N}$ are the loop resistances on each parallel unit. Due to the robust load independent voltage gain from Eq. (2), the two HV bridges in FIG. 15A are replaced by two identical square voltage sources $v_{pri}$ and $nv_{sec}$ in FIG. 15B According to the topology solution, $v_{rc1-N}$ can be replaced by sinewave (CLLC), square wave (EET), or part sinewave plus zero-stage waveform (RC EET). Based on Kirchoff's voltage law (KVL), the terminal voltage $v_{AB}$ can be expressed as:

$$V_{AB} = jwL_{kN}\cdot i_{TN}+v_{rcN}+r_{wN}\cdot i_{TN}\ (N=1,2,3\ldots). \qquad (17)$$

The current sharing performance of CLLC-DCX and EET-DCX power converters have be illustrated in the '353 application. The current sharing performance of CLLC-DCX power converters is sensitive, particularly for tolerance on the leakage inductance $L_k$. Once the converter shifts away from the resonant point, current sharing will be very poor. The EET-DCX proposed in the '353 application has robust current sharing because the square voltage source $v_{rcN}$ can always cancel the impedance from leakage inductance $L_k$. Therefore, current sharing will be only determined by the resistance $r_w$ of each parallel transformer, which can be more easily controlled during manufacturing. The natural current sharing in EET-DCX power converters results from a constant 90-degree phase shift between $v_{rc}$ and $v_{pri(sec)}$. As for the resonant CLLC-DCX, $v_{rc}$ will have a 90-degree phase shift from $v_{rc}$ and $v_{pri(sec)}$ only when it exactly works at resonant point.

Figure 16:
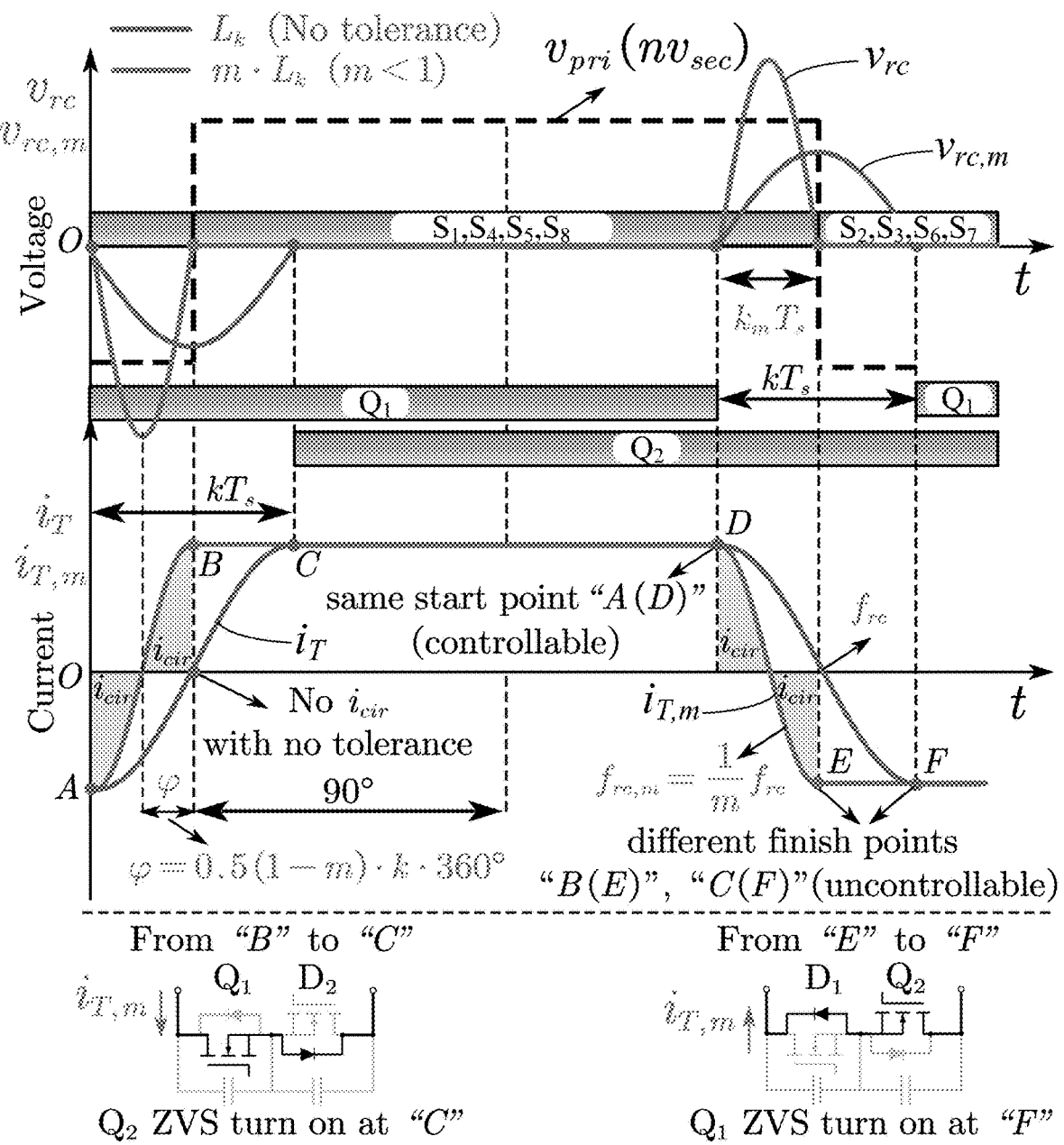
FIG. 16 illustrates the impact of the tolerance on the leakage inductance for the RC EET-DCX shown in FIG. 9 according to aspects of the embodiments.

In the RC EET-DCX power converters described herein, the current sharing in converter-level parallel solutions is different than that in EET-DCX power converters, because the tolerance on $L_k$ will influence the resonant commutation frequency $f_{rc}$ from Eq. (3). To illustrate this impact, FIG. 16 illustrates the impact of the tolerance on the leakage inductance $L_k$ for the RC EET-DCX 100 shown in FIG. 9. FIG. 16 illustrates cases of no tolerance on $L_k$ and when $L_k$ has been multiplied by a factor of m. When m<1, the real leakage inductance $L_k$ is smaller than the designed value of $L_k$. With tolerance m, the resonant commutation voltage $v_{rc,m}$ and transformer current $i_{T,m}$ are both plotted in FIG. 16. As shown, a smaller leakage inductance $mL_k$ will increase the resonant commutation frequency from $f_{rc}$ to $f_{rc,m}$. The relationship between $f_{rc,m}$ and designed $f_{rc}$ can be given as:

$$f_{rc,m} = \frac{1}{m} \cdot f_{rc}, \tag{18}$$

where $f_{rc}$ can be easily derived from Eq. (3) and (4). According to the driving signals for the bidirectional switch $Q_1$ and $Q_2$, the resonant current commutation in FIG. 16 will start at the same time point "A" and "D", either without tolerance ($L_k$) or with tolerance ($mL_k$). If there is no tolerance, the current commutation will end at points "C" and "F". At these two time points, the bidirectional switch $Q_2$ and $Q_1$ will turn on to achieve the ZVS, respectively.

As for the case with $mL_k$ leakage inductance, current commutation will end earlier at time points "B" and "E". Then, after the current commutation, from "B" to "C" and from "E" to "F", the transformer current $i_{T,m}$ will pass through the channel of one of the devices $Q_1$ or $Q_2$ and through the body diode $D_1$ or $D_2$ of another one of the devices $Q_1$ or $Q_2$, as shown in FIG. 16. Even with the $mL_k$ leakage inductance tolerance, the bidirectional switch $Q_1$ and $Q_2$ can still realize ZVS turn on. The reason is that before the devices $Q_1$ or $Q_2$ turn on at points "C" and "F", the transformer current has gone through their body diodes. With the tolerance, a small phase different between $i_T$ and $i_{T,m}$ will occur and the circulating current $i_{cir}$ will exist as shown FIG. 16.

If the real or actual leakage inductance $L_k$ is smaller than the design value, it can be equivalent to a new situation with a small phase shift tolerance $\varphi_m$ (90-degree default) and a new current commutation interval $k_m T_s$, as:

$$\varphi_m = 0.5 \cdot (1 - m) \cdot k \cdot 360° \text{ and} \tag{19}$$

$$k_m = m \cdot k. \tag{20}$$

For example, if k=0.2, and $L_k$ has a −20% tolerance (m=0.8), the phase shift tolerance $\varphi$ is only 7.2 degree and the new $k_m$ is 0.16. When m is larger than 1, which means the real leakage inductance is larger than $L_k$, the bidirectional switch $Q_1$ and $Q_2$ will lose ZVS, and the current sharing performance will be disrupted because resonant current commutation cannot finish during $kT_s$.

Figure 17:
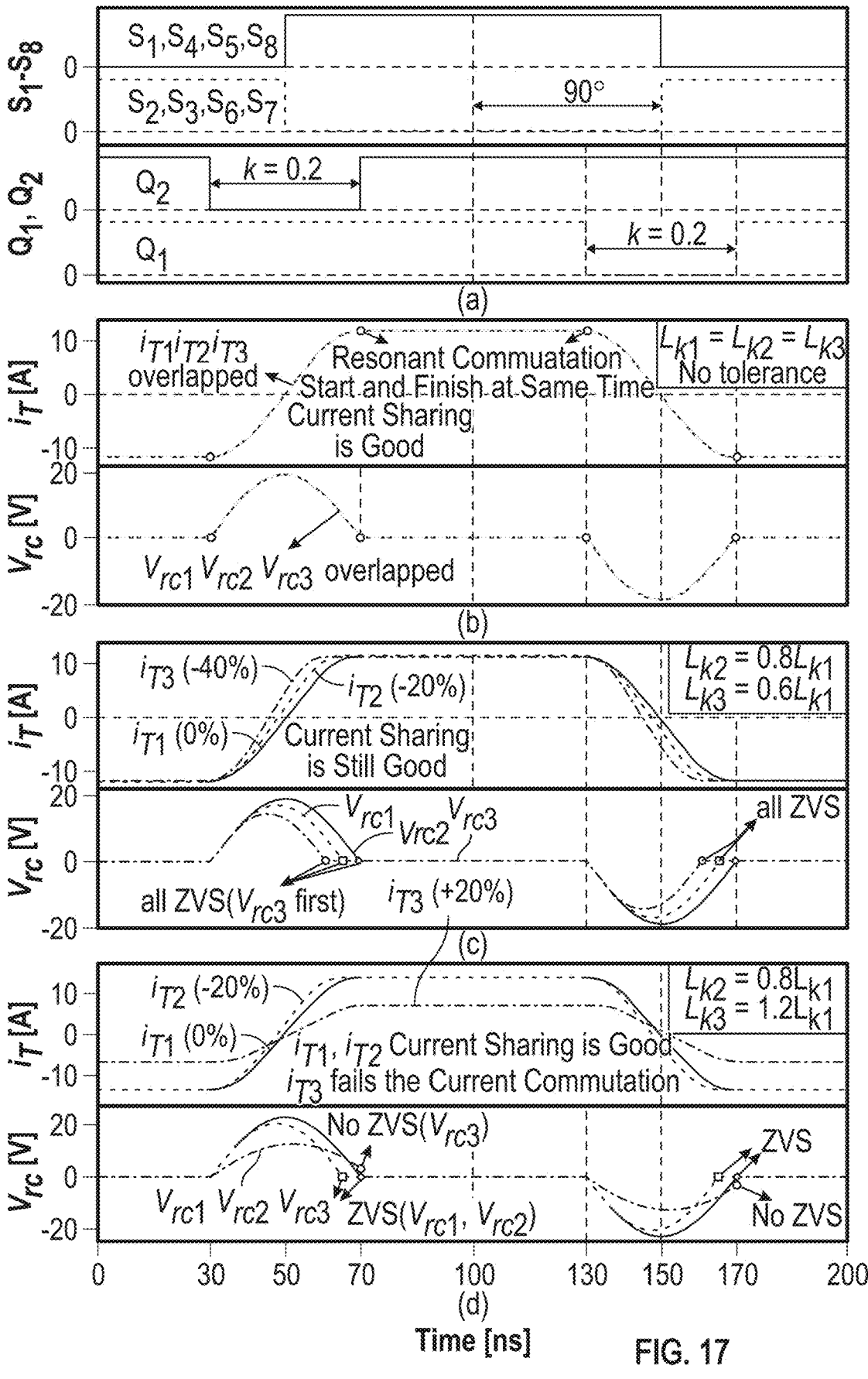
FIG. 17 illustrates simulated waveforms for the RC EET-DCX shown in FIG. 9 with three paralleled transformers according to aspects of the embodiments.

FIG. 17 illustrates simulated waveforms for the RC EET-DCX 100 with three paralleled transformers. The simulation parameters are all listed in Table I.

TABLE I

CURRENT SHARING SIMULATION PARAMETERS

| Variable | Value | Variable | Value |
|---|---|---|---|
| Input voltage $V_{in}$ | 300 V | Output voltage $V_{out}$ | 300 V |
| Parallel number N | 3 | | |
| Rating power P | 9 kW | Loop resistance $r_w$ | 100 mΩ |
| Commutation index k | 0.2 | Switching frequency $f_s$ | 500 kHz |
| Leakage inductance $L_k$ | 210 nH | RC frequency $f_{rc}$ | 2.5 MHz |
| | | Parallel capacitance $C_{o1(2)}$ | 36.2 nF |

In FIG. 17, (a) represents the driving signals of the HV switches $S_1$-$S_8$ and the LV bidirectional switches $Q_1$ and $Q_2$. With no tolerance in the leakage inductance $L_k$ among three paralleled transformers (i.e., $L_{k1}=L_{k2}=L_{k3}$) as shown in (b) of FIG. 17, all three current $i_T$ currents overlap very well and current sharing is very good. In FIG. 17, (c) shows the case with m=0.8 (−20%) and m=0.6 (−40%) for $L_{k2}$ and $L_{k3}$. Based on the previous analysis in FIG. 16, although there is a small phase difference among three transformer currents $i_{T1}$, $i_{T2}$, and $i_{T3}$, the current sharing is still good because current commutation will start at the same point among these three cases. Finally, the larger inductance case when m>1 is depicted in (d) in FIG. 17. According to the previous analysis, if m>1, current commutation will fail, and LV bidirectional switch $Q_1$ and $Q_2$ will lose ZVS because the resonant commutation period becomes larger than $kT_s$. Therefore, some margin on $L_k$ should be provided for in practice to ensure that the resonant current commutation can be finished.

Figure 18:
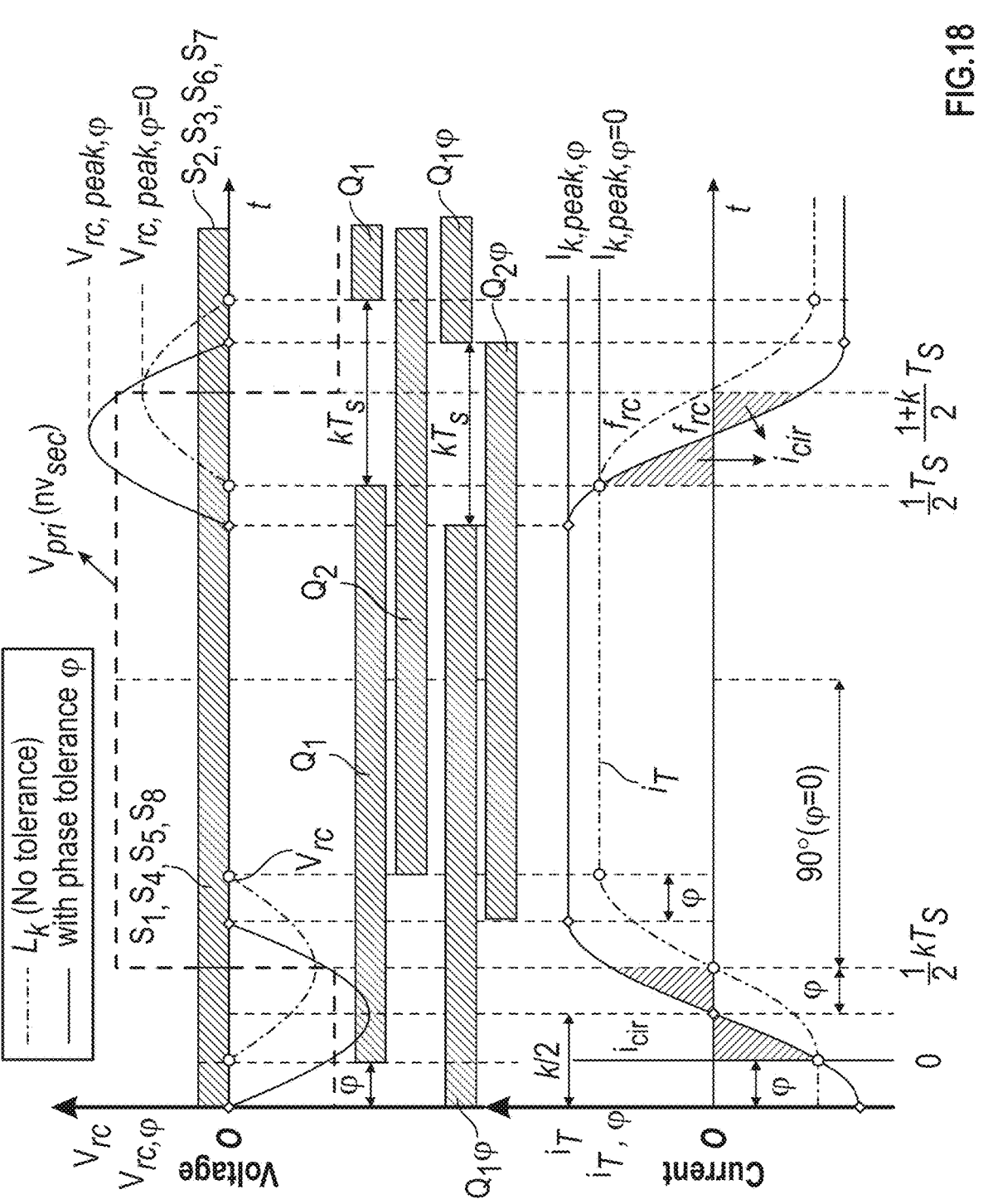
FIG. 18 illustrates the impact of phase shift tolerance on the RC EET-DCX shown in FIG. 9, with a single transformer, according to aspects of the embodiments.

Since the tolerance on the leakage inductance $L_k$ among paralleled transformers can be seen as a phase shift tolerance plus a changed $k_m$, the phase shift tolerance is described below. FIG. 18 illustrates the impact of phase shift tolerance on the RC EET-DCX shown in FIG. 9, with a single transformer, according to aspects of the embodiments. Without the tolerance on the leakage inductance $L_k$, the driving signals for the HV switches $S_1$-$S_8$ should have an open-loop 90-degree phase shift with the LV bidirectional switch $Q_1$ and $Q_2$. However, if there is a small tolerance $\varphi$ on the driving signals because of a gate driver propagation delay, the new gating signals $Q_{1(2),\varphi}$ are also depicted in FIG. 18. After considering this tolerance $\varphi$, the time domain expression for transformer current $i_{T,\varphi}(t)$ can be revised from Eq. (6), as follows:

$$i_{T,\varphi}(t) = \begin{cases} I_{T,peak,\varphi} \cdot \cos(2\pi f_{rc} \cdot t + \varphi) & t \in [-\varphi, k - \varphi] \cdot T_s \\ I_{T,peak,\varphi} & t \in [k - \varphi, 0.5 - \varphi] \cdot T_s \end{cases}, \tag{20}$$

where $I_{T,peak,\varphi}$ is the peak value of the transformer current $i_{T,\varphi}$ with the tolerance. Similarly, the derivation of the $I_{T,peak,\varphi}$ in FIG. 18 can follow the average current calculation as shown below:

$$I_{in} = \text{average current} = \frac{2}{T_s} \int_{\frac{1}{2}kT_s}^{\frac{1+k}{2}T_s} i_{T,\varphi}(t) \cdot dt. \tag{21}$$

From Eqs. (20) and (21), the relationship between $I_{T,peak,\varphi}$ and $I_{in}$ can be given as:

$$I_{T,peak,\varphi} = \frac{\pi}{(1-2k)\pi + 4k \cdot \cos\left(\frac{\varphi}{k} \cdot \pi\right)} \cdot I_{in}. \tag{22}$$

Following the derivation above, the corresponding peak resonant voltage value $V_{rc,peak,\varphi}$ and rms current $I_{T,rms,\varphi}$ can be both revised as:

$$V_{rc,peak,\varphi} = \frac{\pi^2}{k \cdot \left((1-2k)\pi + 4k \cdot \cos\left(\frac{\varphi}{k}\pi\right)\right)} \cdot f_s L_k I_{in} \tag{23}$$

and $$I_{T,rms,\varphi} = \frac{\sqrt{1-k} \cdot \pi}{(1-2k)\pi + 4k \cdot \cos\left(\frac{\varphi}{k}\pi\right)} \cdot I_{in} \tag{24}$$

Figure 19:
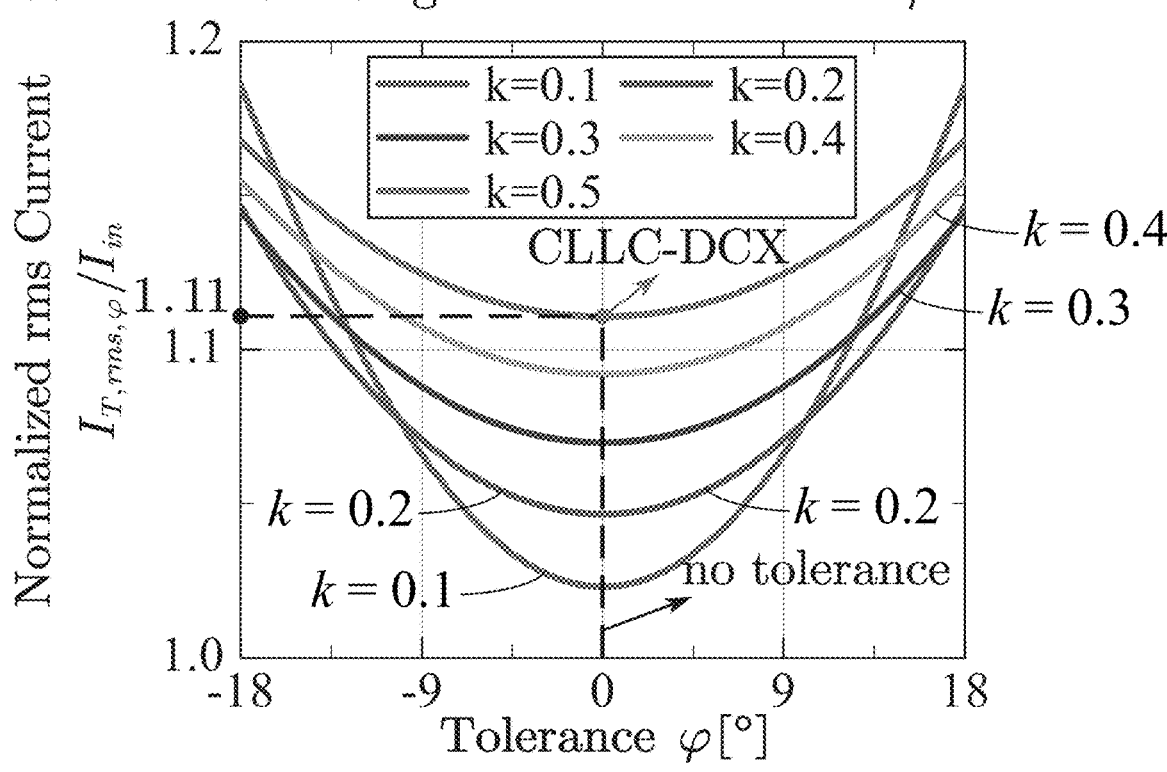
FIG. 19 illustrates normalized transformer current for the RC EET-DCX shown in FIG. 9 with different k according to aspects of the embodiments.

From Eq. (24), with the phase shift tolerance $\varphi$ from $-18$ degree to $+18$ degree, FIG. 19 illustrates the normalized transformer current $I_{T,rms,\varphi}/I_{in}$ based on input DC current with different k. The dashed line in FIG. 19 shows the results with no tolerance ($\varphi=0$). When k=0.5, the normalized transformer current $I_{T,rms,\varphi}/I_{in}$ of the RC EET-DCX 100 will change from a quasi-trapezoidal to a pure sinusoidal current.

The tolerance on phase shift (default 90-degree) will cause a phase shift between terminal voltages $v_{pri(sec)}$ and transformer current $i_{T,\varphi}$ as shown in FIG. 18, which means there are some circulating currents and reactive power. To transfer the same real power, plus some reactive power due to the phase shift tolerance $\varphi$, the transformer rms current will be larger than the no tolerance case shown in FIG. 19.

Figure 20:
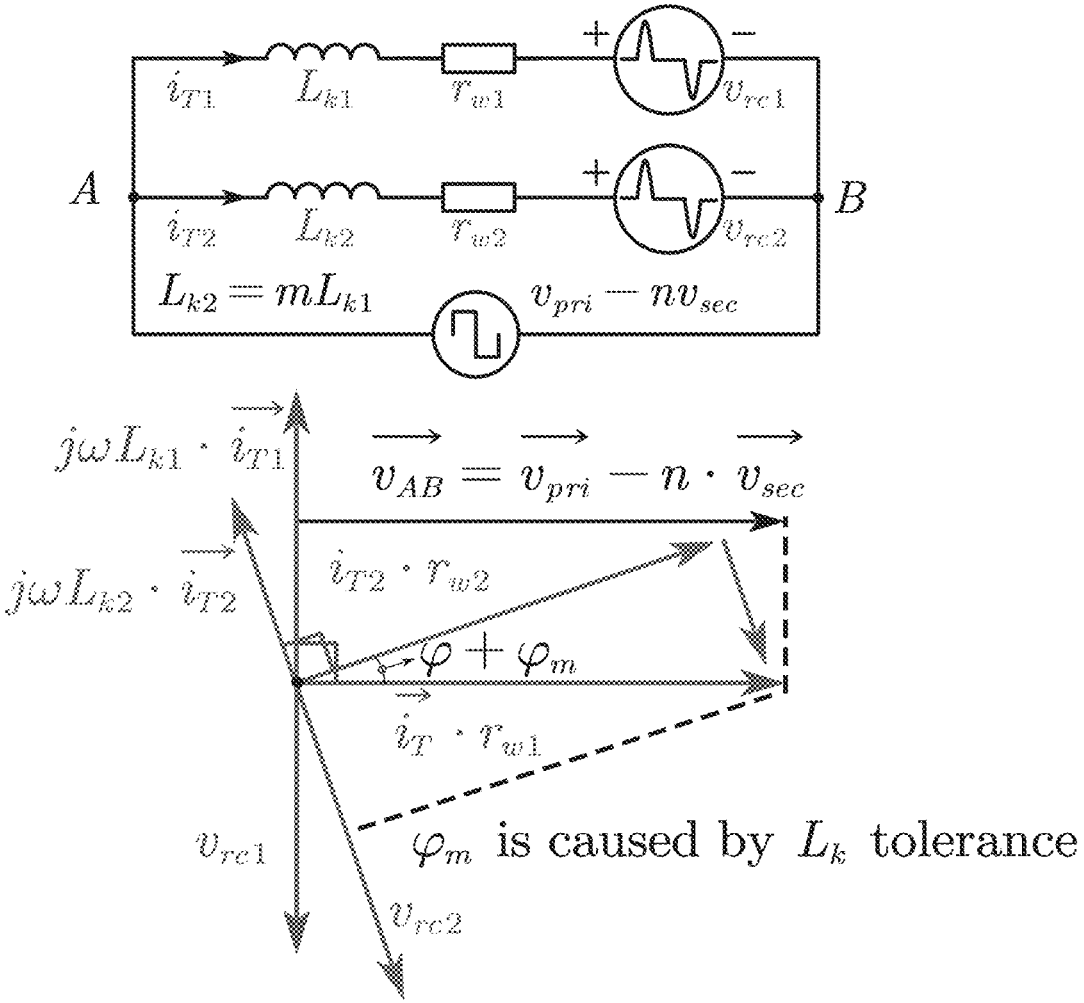
FIG. 20 illustrates a phasor diagram for multiple paralleled RC EETs according to aspects of the embodiments.

When multiple RC EETs are paralleled to scale up the power rating of an RC EET-DCX, the current sharing performance can be analyzed with the phasor diagram as shown in FIG. 20. The current $i_{T1}$ branch has no tolerance, and current $i_{T2}$ branch has both $L_k$ tolerance and phase shift tolerance. As shown in FIG. 20, $\varphi$ is related to the phase shift tolerance on gate drive signals, and $\varphi_m$ is related to the phase shift tolerance caused by $L_k$ tolerance. Due to the same driving signals being applied to the primary and secondary side HV switch bridges 12 and 14, $v_{pri}$ is in phase of $v_{sec}$. On the other hand, in the load-independent analysis, $v_{pri}$ is equal to $nv_{sec}$ because the voltage drop on winding resistance has been ignored. However, in the current sharing analysis, this voltage cannot be ignored, and it results in the voltage $v_{AB}$, which also has the same phase as $v_{pri(sec)}$. Then, Eq. (17) can be converted into vector form, as follows:

$$\vec{v_{AB}} = \vec{i_{T1}} \cdot r_{w1} = \vec{i_{T2}} \cdot r_{w2} + \vec{v_{rc2}} - j\omega L_k \cdot \vec{i_{T2}}. \tag{25}$$

From Eq. (25), the branch $i_{T1}$ (without tolerance) and branch $i_{T2}$ (with tolerance) should have the same voltage drop $v_{AB}$ as shown in FIG. 20. Based on this geometric relationship, the current sharing relationship between $i_{T1}$ and $i_{T2}$ can be given as:

$$\vec{i_{T2}} \cdot r_{w2} = \vec{i_{T1}} \cdot r_{w1} \cdot \cos(\varphi + \varphi_m). \tag{26}$$

To generalize Eq. (26) to N transformer parallel, the current sharing can be given as:

$$i_{T1} : \cdots : i_{TN} = \frac{1}{r_{w1} \cos(\varphi_1 + \varphi_{m1})} : \cdots : \frac{1}{r_{w2} \cos(\varphi_N + \varphi_{mN})}, \tag{27}$$

where $\varphi_{mN}$ can be found in Eq. (19). From Eq. (26), in the steady state, the transformer unit without the tolerance will take more current. The current sharing performance will be mainly determined by total loop resistance $r_w$, which has a positive temperature coefficient and can be easier controlled compared to inductance. As for the phase shift tolerance, for example, if the phase difference is 14.4-degree, the current difference will be only 3%.

Figure 21:
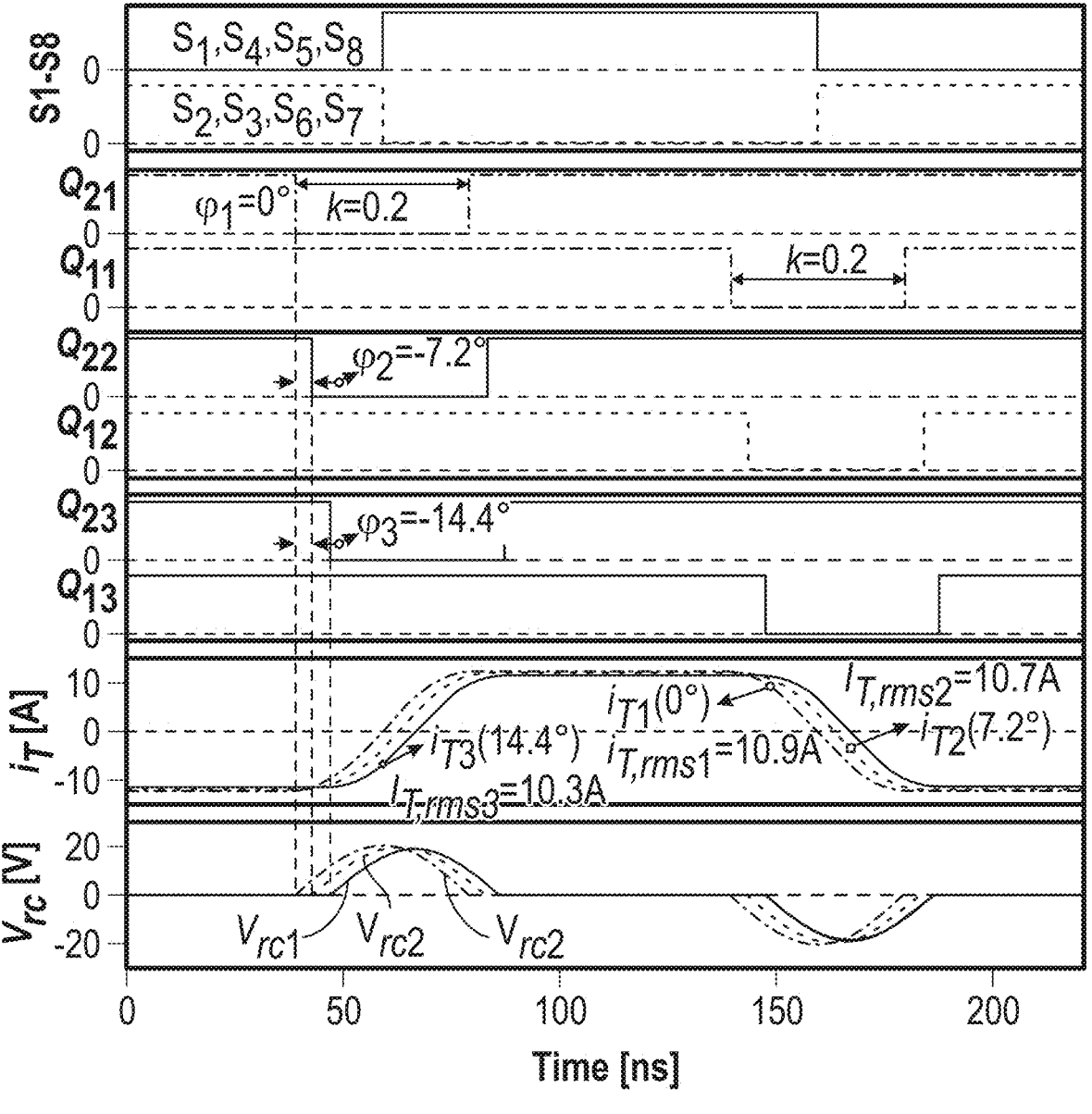
FIG. 21 illustrates simulated waveforms for the RC EET-DCX shown in FIG. 9 with three paralleled transformers and phase tolerance according to aspects of the embodiments.

Following the same parameters listed in Table I, FIG. 21 illustrates simulated current sharing results with phase shift tolerance. Among three paralleled branches, $i_{T1}$, $i_{T2}$, and $i_{T3}$, the phase shift tolerance is 0, $-7.2$, and $-14.4$ degree, respectively. Due to no tolerance on $L_k$, all three currents can finish current commutation during $kT_s$. A small phase difference among the three currents can be found in FIG. 21. However, the rms current for $i_{T1}$, $i_{T2}$, and $i_{T3}$ are 10.9, 10.7, and 10.3 A, respectively, which follows the relationship from Eq. (27). The simulation results in FIG. 21 verify good current sharing among paralleled transformers in an RC EET-DCX even with phase shift tolerance. This phase shift tolerance will have the same impact on the current sharing performance of the EET-DCX described in the '353 application.

To verify the operation and merits of the RC EET-DCX designs described herein, two 12-kW DCX prototypes were reduced to practice, including a RC EET-DCX power converter and a EET-DCX power converter. The DCXs were based on one same platform, and the HV switch bridges were shared (i.e., the same) between the two prototypes. To verify current sharing performance, four modularized RC EET units were paralleled in the RC EET-DCX and four modularized EET units were paralleled in the EET-DCX. The RC EET units had the same size and the winding layout as the EET units. The parameters of the 12 kW RC EET-DCX are listed in Table II.

TABLE II

| PARAMETERS OF RC EET-DCX WITH FOUR EET UNITS | | | |
|---|---|---|---|
| Variable | Value | Variable | Value |
| $V_{in(out)}$ | 300 V | $C_{o1(2)}$ | 22.7 nF |
| P | 12 kW | $f_s$ | 200 kHz |
| $L_k$ | 620 nH | $L_{pri(sec)}$ | 15 µH |
| ER Core | ECW64A18 | Core | DMR51 |
| $C_{oss, pri(sec)}$ | 418 pF × 2 | Material | |
| HV Bridge | C3M0016120k × 2 | $C_{oss, LV}$ | 1310 pF |
| | | LV $Q_1$ and $Q_2$ | EPC 2029 |

The EET units in the EET-DCX included a full LV bridge, and the RC EET units in the RC EET-DCX included an LV bidirectional switch. The same 80 V GaN device EPC 2029 was adopted for both the RC EET and EET units.

The two 12 kW DCX prototypes shared the same Silicon Carbide (SiC) based HV switch bridges on the primary and secondary sides. The only difference between the RC EET-DCX and the EET-DCX was the transformer units. With a total rating power of 12 kW with four transformer units paralleled, each transformer unit was designed for 3 KW (300 V, 10 A). Based on the parameters of $L_k$ and $C_{o1}$, the ideal value of k was calculated as 0.22 from Eq. (3) and (4). However, to prevent current commutation failure caused by tolerance on $L_k$ among the RC EET units, a small margin should be provided for as described above, and k should be slightly larger than 0.22.

In one experiment, a small margin was left for k and the selected value for k was equal to 0.26. Due to the small margin on k, the commutation procedure finished earlier than the bidirectional switch turning on. Under full load (12 kW), a small voltage drop on $v_{ds,Q1,T1}$ was observed after the current commutation because the transformer current went through the body diode of the bidirectional switch first and then ZVS was realized. It was found that the four transformer currents matched very well with each other, to verify the current sharing performance of the RC EET-DCX. Under half load (6 kW), the amplitude of the resonant voltage $v_{ds,Q1,T1}$ and all transformer currents $i_{T1-4}$ reduced by half.

Two other values of k were also evaluated. In one experiment, the value of k was selected as the ideal calculated value of 0.22. Either with full load or half load, the resonant current commutation finished when the bidirectional LV switch turns on. In this case, no current will go through the body diodes of $Q_1$ or $Q_2$, and thus there is no small voltage drop after the current commutation. However, this case will be sensitive to the $L_k$ tolerance because a larger $L_k$ will cause the current commutation failure, and then bidirectional switches $Q_1$ and $Q_2$ will lose ZVS. In another experiment, the value of k was selected at 0.30. Compared with k=0.26, a longer voltage drop time was observed after current commutation. This is because the transformer current goes through the body diodes of $Q_1$ and $Q_2$ over a longer time.

Overall, the experiments confirmed that there is a trade-off on the selection of k. If no margin is left for current commutation (smallest k), the RC EET-DCX converter will have efficiency-wise benefits, because no current will go through the body diodes. However, the converter will be more sensitive to $L_k$ tolerance, especially a larger $L_k$. Depending on the actual $L_k$ tolerance in practice, a small margin is usually given, and the final selected k will be slightly larger than the calculated value.

A 12-kW EET-DCX prototype was also built and tested. Good current sharing performance was also verified among the four EET units in the EET-DCX prototype. Compared with the quasi-trapezoidal current in the RC EET-DCX prototype, the triangular current in the EET-DCX prototype had a larger rms current, which means higher total conduction loss.

Figure 22:
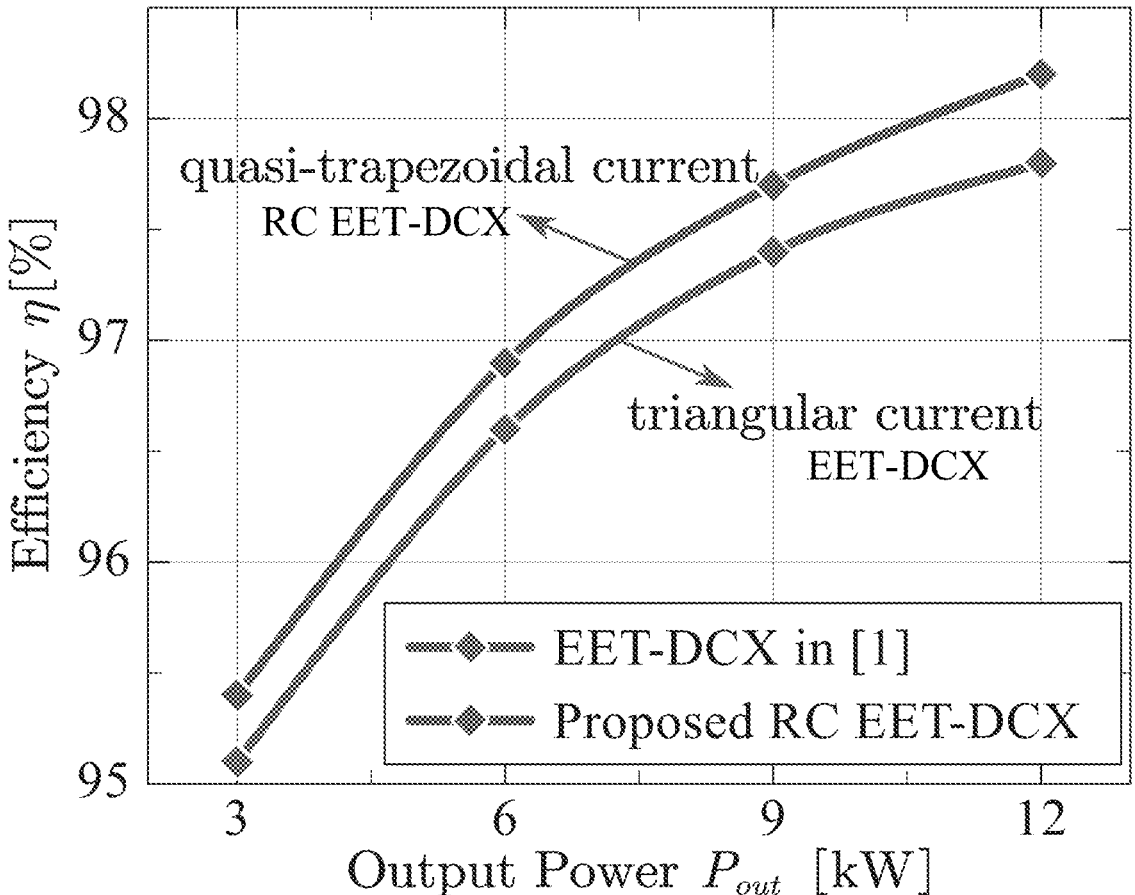
FIG. 22 illustrates example efficiency results for an RC EET-DCX and an EET-DCX according to aspects of the embodiments.

With the same 12 kW testbench (i.e., same HV switch bridges, same transformer winding layout, etc.), FIG. 22 shows the efficiency test results for both the RC EET-DCX prototype and the EET-DCX prototype. The triangular current waveform in EET-DCX exhibits a higher rms current as compared to the quasi-trapezoidal current in the RC EET-DCX. In the RC EET-DCX, this reduction in conduction loss not only applies to the transformer windings but also to the HV switch bridge devices. Thus, as compared to the EET-DCX prototype, the RC EET-DCX prototype showed a higher efficiency (e.g., 98.4% at 12 kW) over the entire load range. This efficiency benefit is particularly advantageous in high-current, high-power applications, as the additional loss on the LV bridge becomes less significant in comparison.

Figure 23:
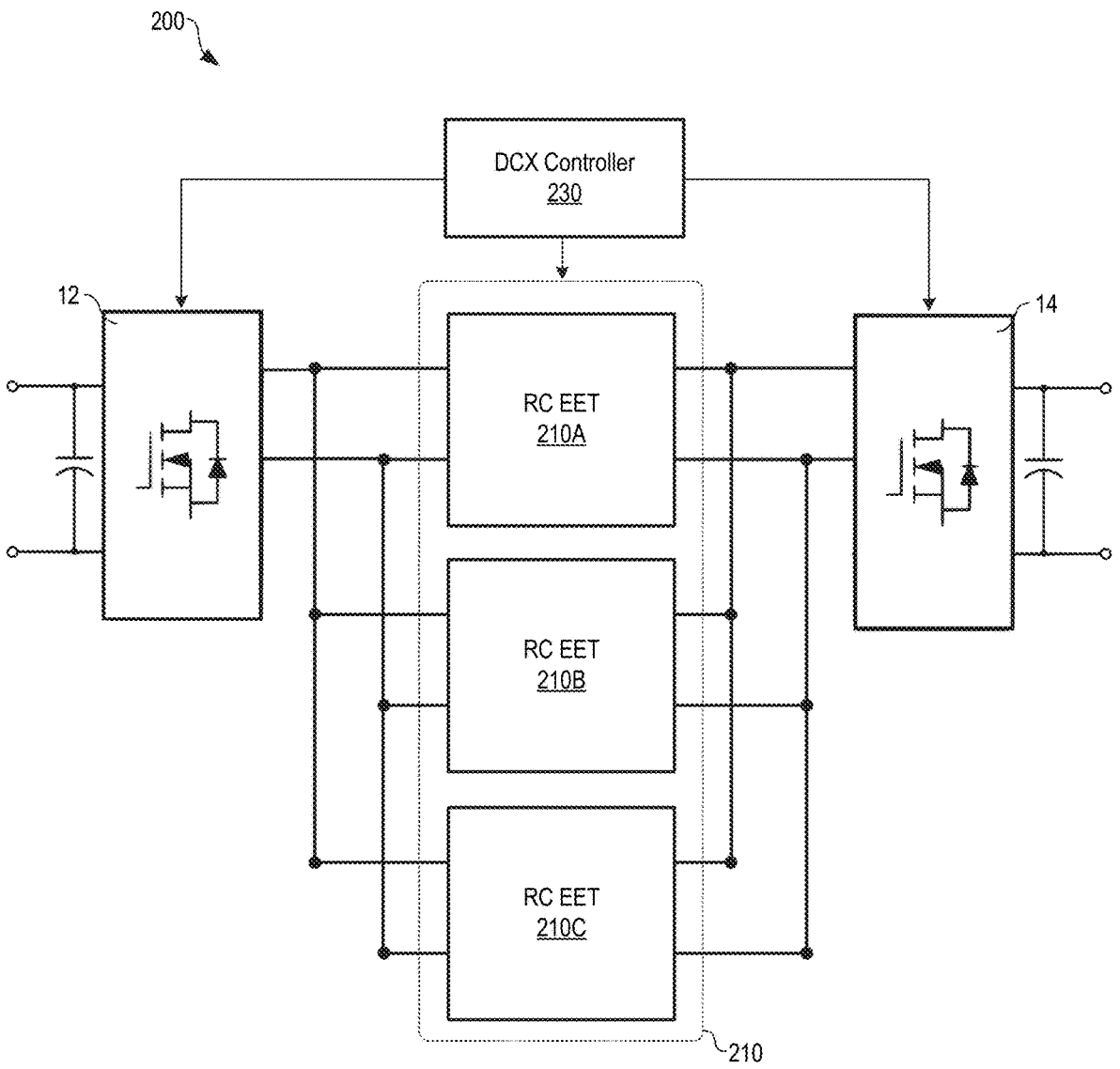
FIG. 23 illustrates an example of an RC EET-DCX with a parallel arrangement of RC EETs according to aspects of the embodiments.

The resonant commutation and quasi-trapezoidal current modulation control techniques described herein can be extended to parallel and serial arrangements of RC EETs in a DCX converter. FIG. 23 illustrates an example of an RC EET-DCX 200 with a parallel arrangement of RC EETs according to aspects of the embodiments. The RC EET-DCX 200 is illustrated as a representative example. The RC EET-DCX 200 can vary as compared to that shown. For example, the RC EET-DCX 200 can include other components that are not illustrated in FIG. 23, such as additional RC EETs, and the RC EET-DCX 200 can omit one or more of the components that are illustrated in FIG. 23. The switching devices, transformers, controllers, and other components in the RC EET-DCX 200 can be embodied as described herein or using other suitable devices (e.g., other types of transistors, transformers, controllers, etc.), as the RC EET-DCX 200 is not limited to being implemented with any particular type or style of electronic components.

As shown, the RC EET-DCX 200 includes the first or input switching bridge 12, the second or output switching bridge 14, RC EETs 210A-210C, and a DCX controller 230. Each of the RC EETs 210A-210C is similar to the RC EET 120 shown in FIG. 9. The RC EETs 210A-210C are coupled in parallel between the first and second switching bridges 12 and 14 and, collectively, form an electronically-controlled parallel transformer 210 for high current applications. Although three RC EETs 210A-210C are shown, the RC EET-DCX 200 can include any suitable number of RC EETs depending on the desired power handling (e.g., current handling) capacity of the RC EET-DCX 200. Among possibly other components, each RC EET 210A-210C includes a bidirectional coupling switch bridge, a primary transformer winding, and a secondary transformer winding.

The DCX controller 230 can be similar to the DCX controller 130 and embodied as processing circuitry, including memory, configured to control the operation of the DCX 200. In some cases, the DCX controller 230 can receive a metric or measure of one or more of the input voltage $V_{in}$, the input current $I_{in}$, the output voltage $V_o$, output current $I_{out}$ or power provided to a load $R_L$ (not shown in FIG. 23), the operating frequency fs, or other operating metrics of the RC EET-DCX 200 as inputs, along with external control inputs.

The DCX controller 230 is configured to generate drive or switching control signals for the first and second switching bridges 12 and 14 at a switching frequency $f_s$. The switching control signals direct the operation of the switching bridges 12 and 14 to transfer power between the input and the output of the RC EET-DCX 200. The DCX controller 230 is also configured to generate drive control signals based on quasi-trapezoidal current modulation control for the switching devices in the bidirectional coupling switch bridge of each RC EET 210A-210C.

The RC EET-DCX 200 offers an improvement as compared to the DCX 60 shown in FIG. 8 and described above. Particularly, even if the transformers in the RC EETs 210A-210C have small differences among $L_k$ inductances in the RC EETs 210A-210C, the DCX controller 230 is configured to provide drive control signals to the bidirectional coupling switch bridges in the RC EETs 210A-210C, as described herein, for current balancing among the RC EETs 210A-210C.

In the DCX 60 shown in FIG. 8, the branch impedance of each transformer 20A-20C is a combination of the impedances of the series winding resistance $R_w$, the inductance $L_k$, and the capacitance $C_r$ of each transformer 20A-20C. This leads to current sharing issues when the branch impedances vary among the transformers 20A-20C, such as when manufacturing tolerances lead to different $L_k$ inductances among the transformers 20A-20C. In the DCX 200, the $L_k$ inductance in each RC EET 210A-210C is effectively canceled, leaving the branch impedance of each RC EET 210A-210C to be only the series winding resistance $R_w$ of each RC EET 210A-210C. The series winding resistances $R_w$ in the RC EETs 210A-210C are typically very low (e.g., in the range of tens of milliohms) and do not contribute significantly to current sharing issues or imbalances in the DCX 200.

Figure 24:
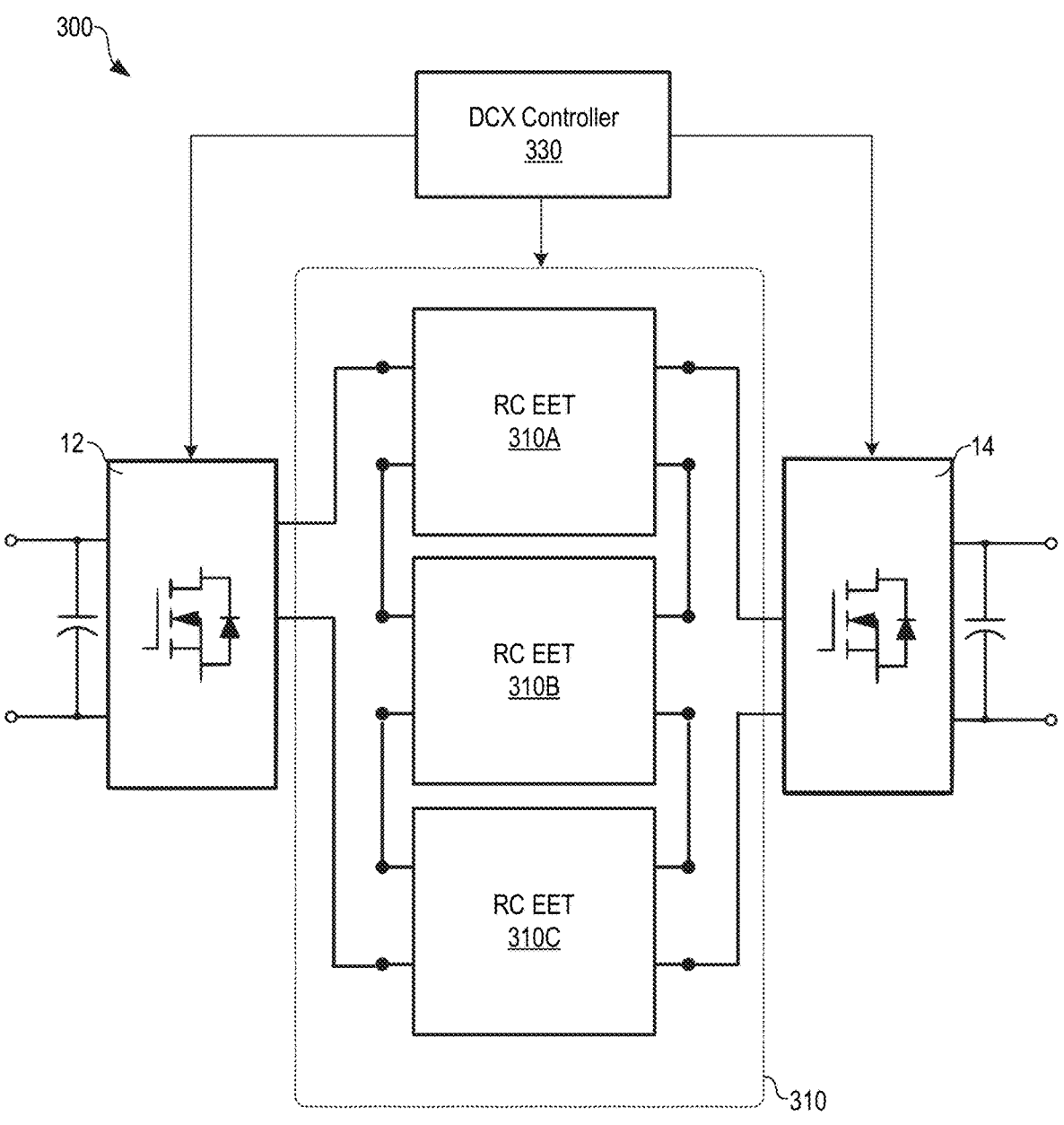
FIG. 24 illustrates an example of an RC EET-DCX with a series arrangement of RC EETs according to aspects of the embodiments.

FIG. 24 illustrates an example of an RC EET-DCX 300 with a series arrangement of RC EETs according to aspects of the embodiments. The RC EET-DCX 300 is illustrated as a representative example. The RC EET-DCX 300 can vary as compared to that shown. For example, the RC EET-DCX 300 can include other components that are not illustrated in FIG. 24, such as additional RC EETs, and the RC EET-DCX 300 can omit one or more of the components that are illustrated in FIG. 24. The switching devices, transformers, controllers, and other components in the RC EET-DCX 300 can be embodied as described herein or using other suitable devices (e.g., other types of transistors, transformers, controllers, etc.), as the RC EET-DCX 300 is not limited to being implemented with any particular type or style of electronic components.

As shown, the RC EET-DCX 300 includes the first or input switching bridge 12, the second or output switching bridge 14, RC EETs 310A-310C, and a DCX controller 330. Each of the RC EETs 310A-310C is similar to the RC EET 120 shown in FIG. 9. The RC EETs 310A-310C are coupled in series between the first and second switching bridges 12 and 14 and, collectively, form an electronically-controlled series transformer 310 for high voltage applications. Although three RC EETs 310A-310C are shown, the RC EET-DCX 300 can include any suitable number of RC EETs depending on the desired power handling (e.g., voltage handling) capacity of the RC EET-DCX 300. Among possibly other components, each RC EET 210A-210C includes a bidirectional coupling switch bridge, a primary transformer winding, and a secondary transformer winding.

The DCX controller 330 can be similar to the DCX controller 130 and embodied as processing circuitry, including memory, configured to control the operation of the RC EET-DCX 300. In some cases, the DCX controller 330 can receive a metric or measure of one or more of the input voltage $V_{in}$, the input current $I_{in}$, the output voltage $V_o$, output current $I_{out}$ or power provided to a load $R_L$ (not shown in FIG. 24), the operating frequency fs, or other operating metrics of the RC EET-DCX 300 as inputs, along with external control inputs.

The DCX controller 330 is configured to generate drive or switching control signals for the first and second switching bridges 12 and 14 at a switching frequency $f_s$. The switching control signals direct the operation of the switching bridges 12 and 14 to transfer power between the input and the output of the RC EET-DCX 300. The DCX controller 330 is also configured to generate drive control signals based on quasi-trapezoidal current modulation control for the switching devices in the bidirectional coupling switch bridge of each RC EET 310A-310C.

The RC EET-DCX 300 offers an improvement as compared to the DCX 60 shown in FIG. 8 and described above. Particularly, even if the transformers in the RC EETs 310A-310C have small differences among $L_k$ inductances in the RC EETs 310A-310C, the DCX controller 330 is configured to provide drive control signals to the bidirectional coupling switch bridges in the RC EETs 310A-310C, as described herein, for current balancing among the RC EETs 310A-310C.

Other embodiments can include combinations of the parallel transformer 210 shown in FIG. 23 and the series transformer 310 shown in FIG. 24. For example, a number of the series transformers 310 shown in FIG. 24 can be arranged in parallel with each other, similar to the way that the RC EETs 210A-210C shown in FIG. 23 are coupled in parallel with each other. This way, a power converter system can be implemented to have both high voltage and high current capabilities, while incorporating the benefits of RC EET-based current sharing and load-independent voltage gain described herein.

FIG. 23A illustrates an example of an EET module 600 according to aspects of the embodiments. The EET module 600 is illustrated as a representative example implementation of an EET according to the concepts described herein. The EETs described herein can be embodied in other ways and in other formats besides that shown in FIG. 23A. In the example shown, the EET module 600 includes a magnetic core having a first magnetic core section 610A and a second magnetic core section 610B. The EET module 600 also includes a printed circuit board (PCB) 620. The PCB 620 includes primary and secondary windings for a transformer of the EET module 600, implemented among layers of the PCB 620. Among other components, a resonant capacitor and a full bridge of switching devices can be mounted and electrically coupled to the PCB 620.

Figure 25:
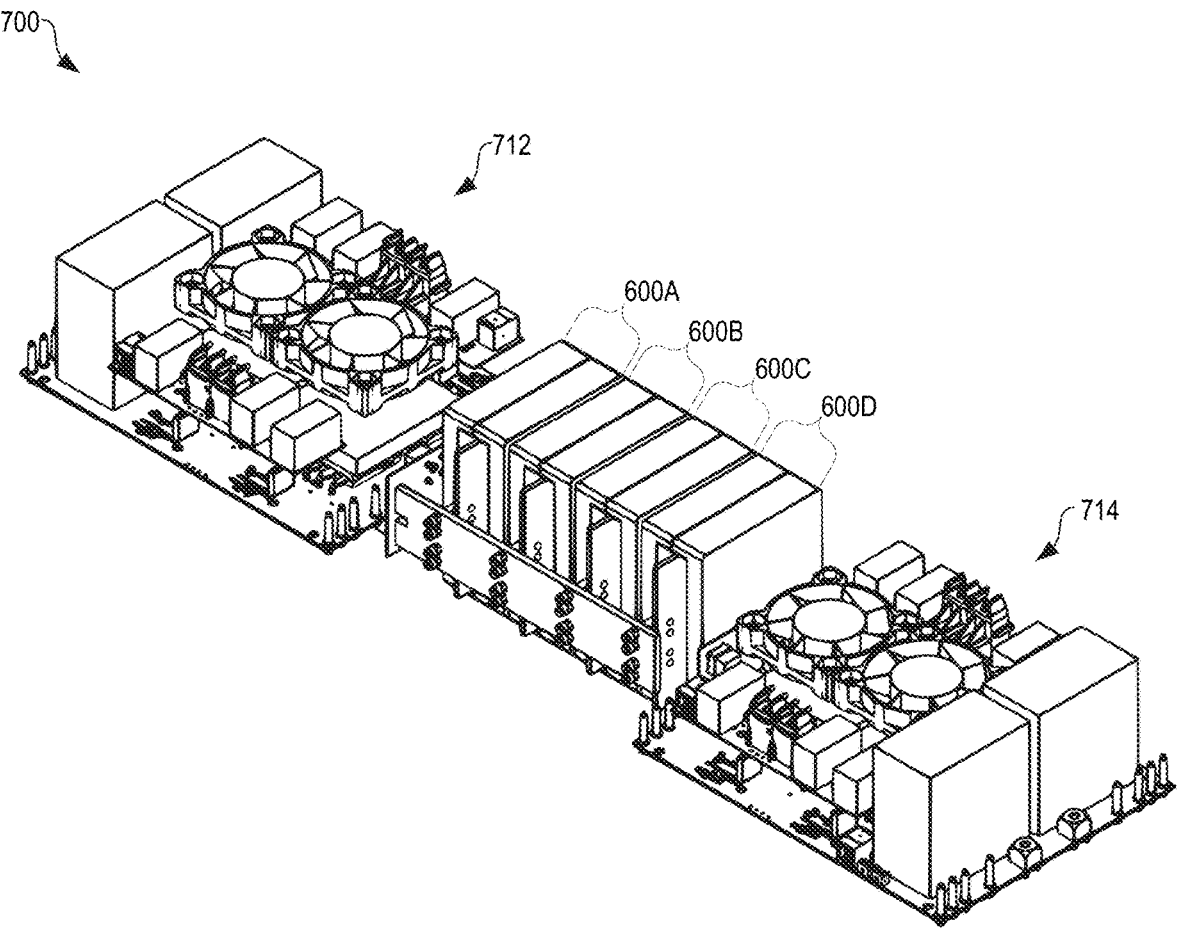
FIG. 25 illustrates an example power converter system including a number of RC EET modules according to aspects of the embodiments.

FIG. 25 illustrates an example power converter system 700 including a number of the RC EET modules according to aspects of the embodiments. The system 700 is illustrated as a representative example according to the concepts described herein. The power converter systems described herein can be embodied in other ways and in other formats besides that shown in FIG. 25. As shown, the power converter system 700 includes a first or input switching bridge 712, a second or output switching bridge 714, and a transformer coupled between the bridges 712 and 714. The transformer is implemented as a number of RC EET modules, including RC EET modules 600A-600D. The RC EET modules 600A-600D are arranged in parallel between the switching bridges 712 and 714 in FIG. 25, although other arrangements, including series arrangements and series/parallel arrangements are within the scope of the embodiments.

Use of RC EET modules, such as the RC EET modules 600A-600D, provides flexibility in the design of power converter systems 700, including in DCX converters, among others. Any number of RC EET modules can be easily added in series or parallel arrangements, to increase the power handling capacity of a power converter system.

One or more microprocessors, microcontrollers, or DSPs can execute software to perform the control aspects of the embodiments described herein, such as the control aspects performed by the controller 70, the controller 130, the controller 230, or the controller 330. Any software or program instructions can be embodied in or on any suitable type of non-transitory computer-readable medium for execution. Example computer-readable mediums include any suitable physical (i.e., non-transitory or non-signal) volatile and non-volatile, random and sequential access, read/write and read-only, media, such as hard disk, floppy disk, optical disk, magnetic, semiconductor (e.g., flash, magneto-resistive, etc.), and other memory devices. Further, any component described herein can be implemented and structured in a variety of ways. For example, one or more components can be implemented as a combination of discrete and integrated analog and digital components.

The above-described examples of the present disclosure are merely possible examples of implementations set forth for a clear understanding of the principles of the disclosure. Many variations and modifications can be made without departing substantially from the spirit and principles of the disclosure. All such modifications and variations are intended to be included herein within the scope of this disclosure and protected by the following claims.

Therefore, the following is claimed:

1. A power converter system, comprising:

an input and an output;

a power converter between the input and the output, the power converter comprising:

a first bridge of switching devices;

a second bridge of switching devices; and an electronic-embedded transformer between the first bridge and the second bridge, the electronic-embedded transformer comprising a bidirectional coupling switch bridge; and a controller configured to generate drive control signals for quasi-trapezoidal current modulation control of the bidirectional coupling switch bridge, wherein:

the bidirectional coupling switch bridge of the electronic-embedded transformer comprises bidirectional switching devices $Q_1$ and $Q_2$ and capacitors $C_{o1}$ and $C_{o2}$;

the drive control signals control switching operations of the bidirectional switching devices $Q_1$ and $Q_2$;

the controller is further configured to generate the drive control signals based on a commutation coefficient k and a switching frequency for the power converter; and the commutation coefficient k is calculated based on an inductance $L_k$ in the electronic-embedded transformer and a capacitance of the capacitors $C_{o1}$ and $C_{o2}$.

2. The power converter system according to claim 1, wherein the controller is further configured to generate the drive control signals for the bidirectional coupling switch bridge for transformer current commutation in the electronic-embedded transformer.

3. The power converter system according to claim 1, wherein the controller is further configured to:

generate switching control signals for the first bridge of switching devices and the second bridge of switching devices; and generate the drive control signals for quasi-trapezoidal current modulation control of the bidirectional coupling switch bridge.

4. The power converter system according to claim 1, wherein the commutation coefficient k is calculated based on an inductance $L_k$ in the electronic-embedded transformer, a capacitance of the capacitors $C_{o1}$ and $C_{o2}$, and a margin for resonant current commutation.

5. The power converter system according to claim 1, wherein the electronic-embedded transformer comprises a module in the power converter.

6. The power converter system according to claim 1, wherein the electronic-embedded transformer comprises a plurality of electronic-embedded transformers coupled in parallel between the first bridge and the second bridge.

7. The power converter system according to claim 1, wherein the electronic-embedded transformer comprises a plurality of electronic-embedded transformers coupled in series between the first bridge and the second bridge.

8. An electronic-embedded transformer for a power converter, comprising:

a primary winding;

a secondary winding;

a resonant inductor for use in the power converter, the resonant inductor being embodied as leakage inductance among the primary winding and the secondary winding;

a bidirectional coupling switch bridge; and a controller configured to generate drive control signals for quasi-trapezoidal current modulation control of the bidirectional coupling switch bridge, wherein:

the bidirectional coupling switch bridge comprises bidirectional switching devices $Q_1$ and $Q_2$ and capacitors $C_{o1}$ and $C_{o2}$;

the drive control signals control switching operations of the bidirectional switching devices $Q_1$ and $Q_2$;

the controller is further configured to generate the drive control signals based on a commutation coefficient k and a switching frequency for the power converter; and the commutation coefficient k is calculated based on an inductance $L_k$ in the electronic-embedded transformer and a capacitance of the capacitors $C_{o1}$ and $C_{o2}$.

9. The electronic-embedded transformer according to claim 8, wherein the commutation coefficient k is calculated based on an inductance $L_k$ in the electronic-embedded transformer, a capacitance of the capacitors $C_{o1}$ and $C_{o2}$, and a margin for resonant current commutation.

10. The electronic-embedded transformer according to claim 9, wherein bidirectional coupling switch bridge comprises a monolithic bidirectional switch.

11. The electronic-embedded transformer according to claim 8, wherein the electronic-embedded transformer comprises a module in the power converter.

12. A power converter system, comprising:

a power converter comprising:

a first bridge of switching devices;

a second bridge of switching devices; and an electronic-embedded transformer between the first bridge and the second bridge, the electronic-embedded transformer comprising a bidirectional coupling switch bridge, the bidirectional coupling switch bridge comprising switching devices $Q_1$ and $Q_2$ and capacitors $C_{o1}$ and $C_{o2}$; and a controller configured to:

generate switching control signals for the first bridge of switching devices and the second bridge of switching devices; and generate drive control signals for the switching devices $Q_1$ and $Q_2$, wherein:

the controller is further configured to generate the drive control signals based on a commutation coefficient k and a switching frequency for the power converter; and the commutation coefficient k is calculated based on an inductance $L_k$ in the electronic-embedded transformer, a capacitance of the capacitors $C_{o1}$ and $C_{o2}$, and a margin for resonant current commutation.

13. The power converter system according to claim 12, wherein the controller is further configured to generate the drive control signals for the switching devices $Q_1$ and $Q_2$ for transformer current commutation in the electronic-embedded transformer.

14. The power converter system according to claim 12, wherein the electronic-embedded transformer comprises a plurality of electronic-embedded transformers coupled in parallel between the first bridge and the second bridge.

\* \* \* \* \*